United States Patent [19]

Flax

[11] Patent Number: 4,782,450
[45] Date of Patent: Nov. 1, 1988

[54] METHOD AND APPARATUS FOR PASSIVE AIRBORNE COLLISION AVOIDANCE AND NAVIGATION

[76] Inventor: Bennett Flax, 1001 Playford La., Silver Spring, Md. 20901

[21] Appl. No.: 769,701

[22] Filed: Aug. 27, 1985

[51] Int. Cl.$^4$ .............................................. G01S 1/24
[52] U.S. Cl. ..................................... 364/461; 342/32
[58] Field of Search ............... 364/460, 461, 449, 451, 364/452, 456; 342/39, 40, 37, 29, 30, 32

[56] References Cited

U.S. PATENT DOCUMENTS

| | | | |
|---|---|---|---|
| 3,742,503 | 6/1973 | Stratton | 342/456 |
| 3,851,334 | 11/1974 | Coleman et al. | 342/30 |
| 3,875,570 | 4/1975 | Litchford | 342/32 |
| 3,900,846 | 8/1975 | Gibbon et al. | 342/37 |
| 3,959,793 | 5/1976 | Litchford | 342/32 |
| 4,027,307 | 5/1977 | Litchford | 342/32 |
| 4,115,771 | 9/1978 | Litchford | 342/37 |
| 4,128,839 | 12/1978 | McComas | 342/32 |
| 4,196,434 | 4/1980 | Funatsu et al. | 342/32 |
| 4,293,857 | 10/1981 | Baldwin | 342/32 |
| 4,486,755 | 12/1984 | Hulland et al. | 342/32 |
| 4,583,177 | 4/1986 | Meyer | 364/451 |
| 4,642,639 | 2/1987 | Nelson | 342/47 |

OTHER PUBLICATIONS

Bagnall, "Single Radar—Passive *only* Operation", 8/20/76.
Hwoschinsky et al, "A Single Site Passive Collision Avoidance System", Jun. 1977, From the 33rd Annual Meeting of the Inst. of Navigation.

Primary Examiner—Parshotam S. Lall
Assistant Examiner—Thomas G. Black
Attorney, Agent, or Firm—Benjamin J. Goldfarb

[57] ABSTRACT

A passive method for an aircraft to use its on-board locating apparatus to monitor interrogation signals and ISLS signals transmitted by at least one secondary surveillance radar, and coded reply signals transmitted by at least one fixed ground transponder; to match said transponder reply signals with said ISLS signals, in order to associate said transponder reply signals with interrogations from said radar; to repetitiously compute said aircraft's instantaneous position in space, said computations being based on hyperbolic and linear functions related to said aircraft, said radar, and said associated fixed transponder; and to display said positions for navigational purposes. Furthermore, having said computations, said passive method uses said locating apparatus to monitor coded reply signals from transponders of other aircraft; to match said other-aircraft reply signals with said ISLS signals to determine which other-aircraft transponder reply signals are associated with interrogations from said radar; to repetitiously compute the instantaneous positions of other aircraft in space, said computations being based on elliptic and linear functions related to said locating apparatus' own aircraft, said other aircraft, and said radar; and to display said positions for collision-avoidance purposes.

11 Claims, 16 Drawing Sheets

TRANSPONDER REPLY FOR CODE 3542

(a) NO REAL SOLUTIONS (b) EXACTLY ONE REAL SOLUTION (c) TWO REAL SOLUTIONS

Loading and Sorting Input from the 1090 MHz Receiver (See figure 11, step 106)

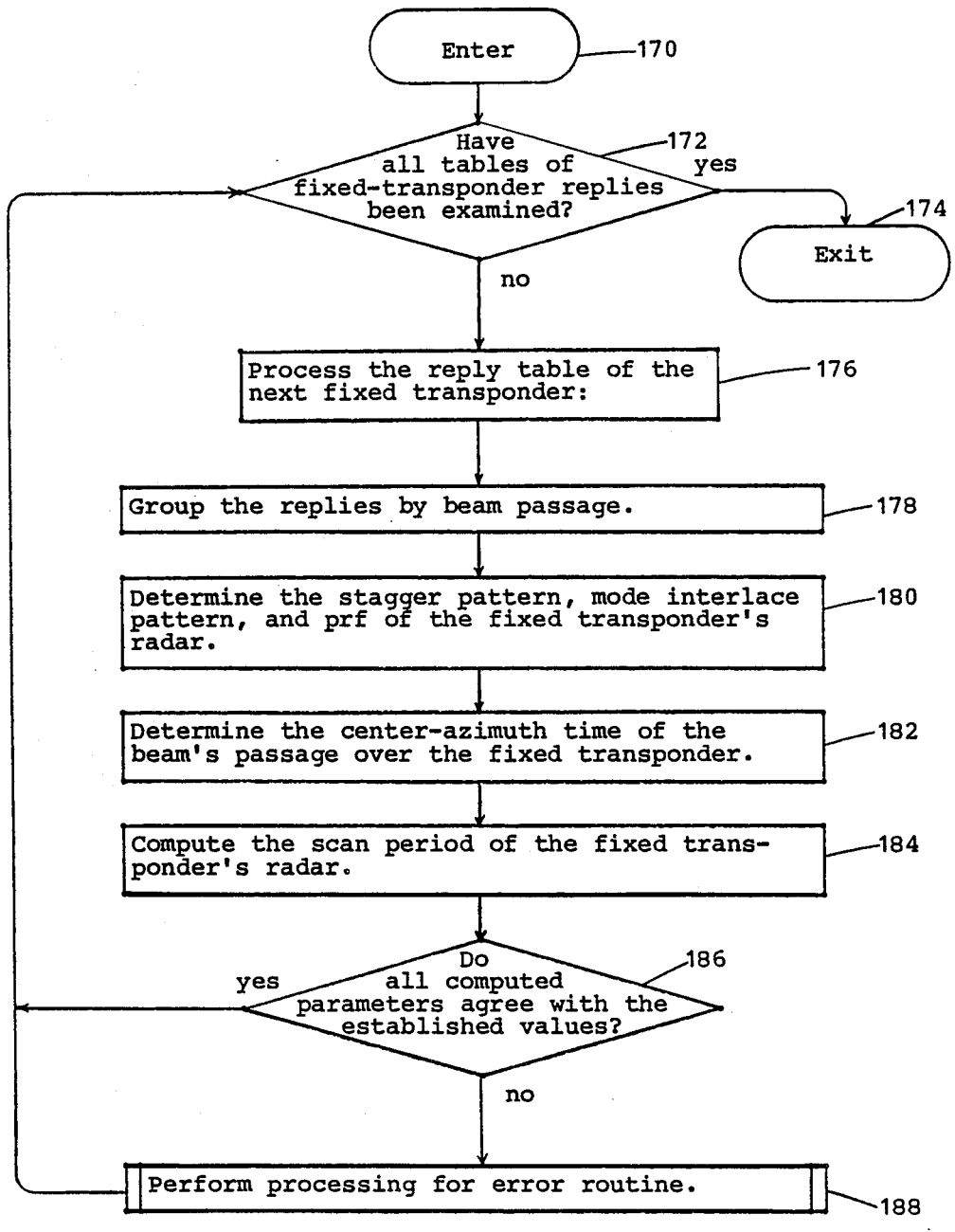

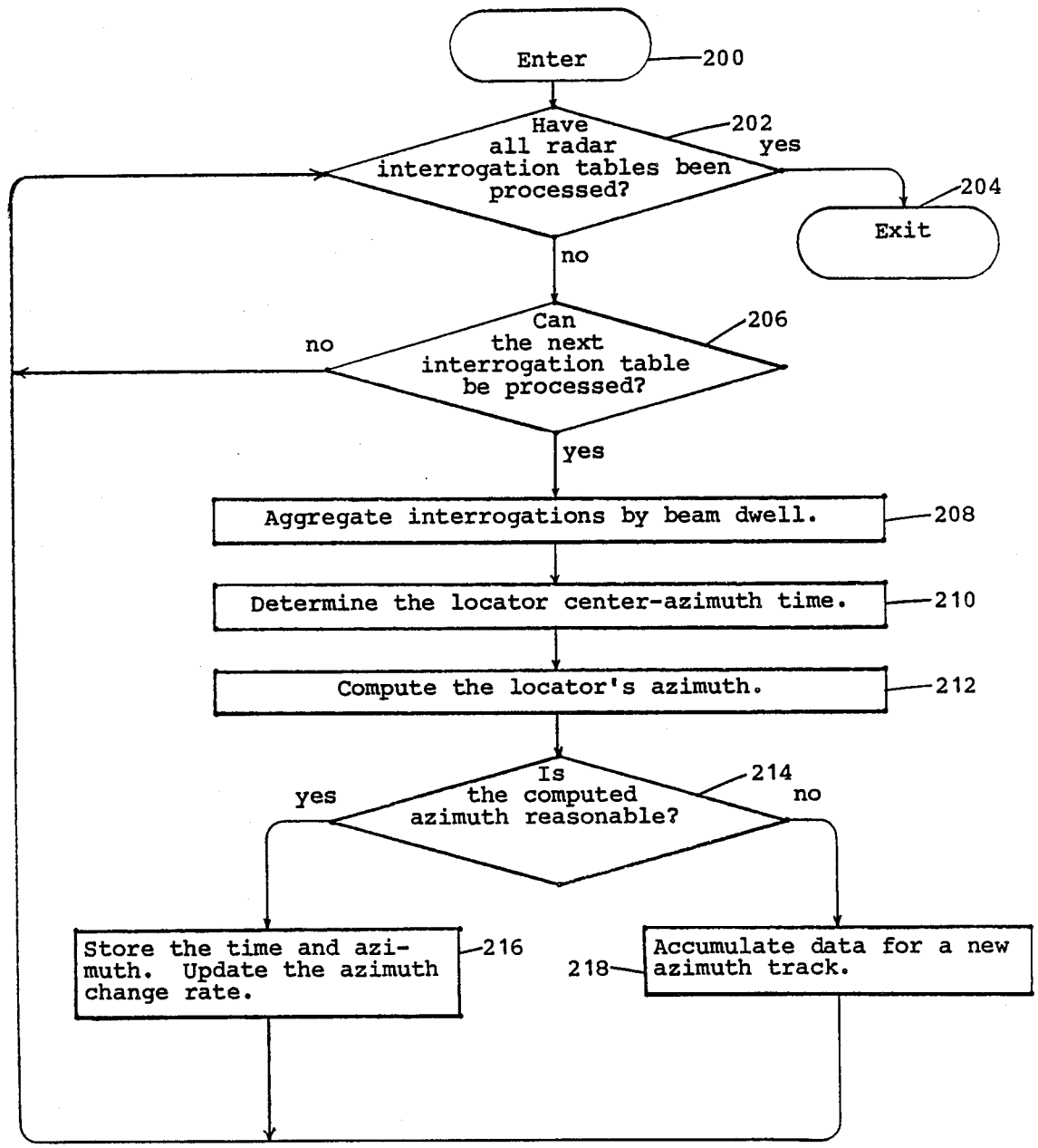

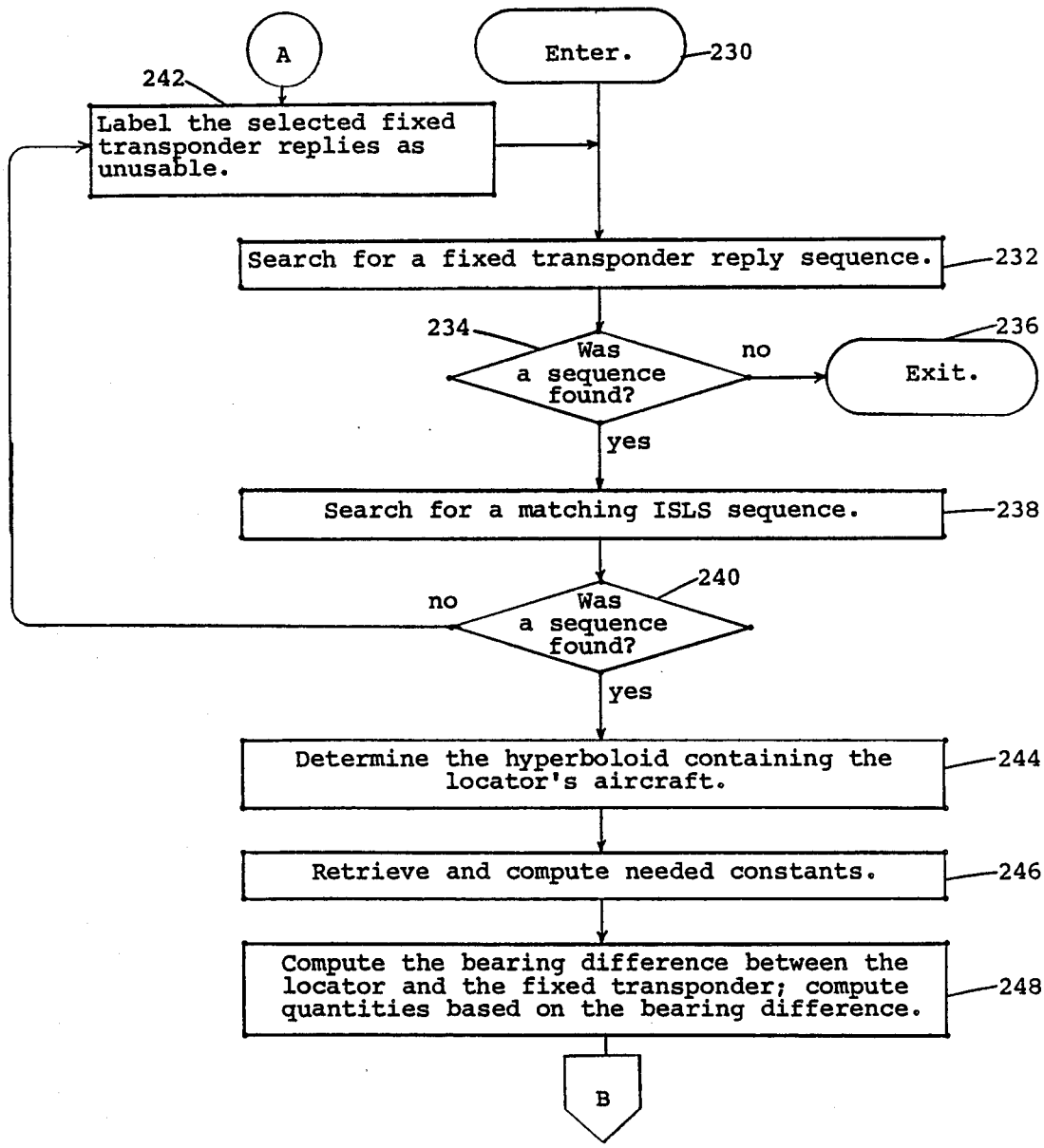
FIG. 18. (1 OF 3)
Determining the Position of the Locator's Aircraft
(See figure 11, step 112)

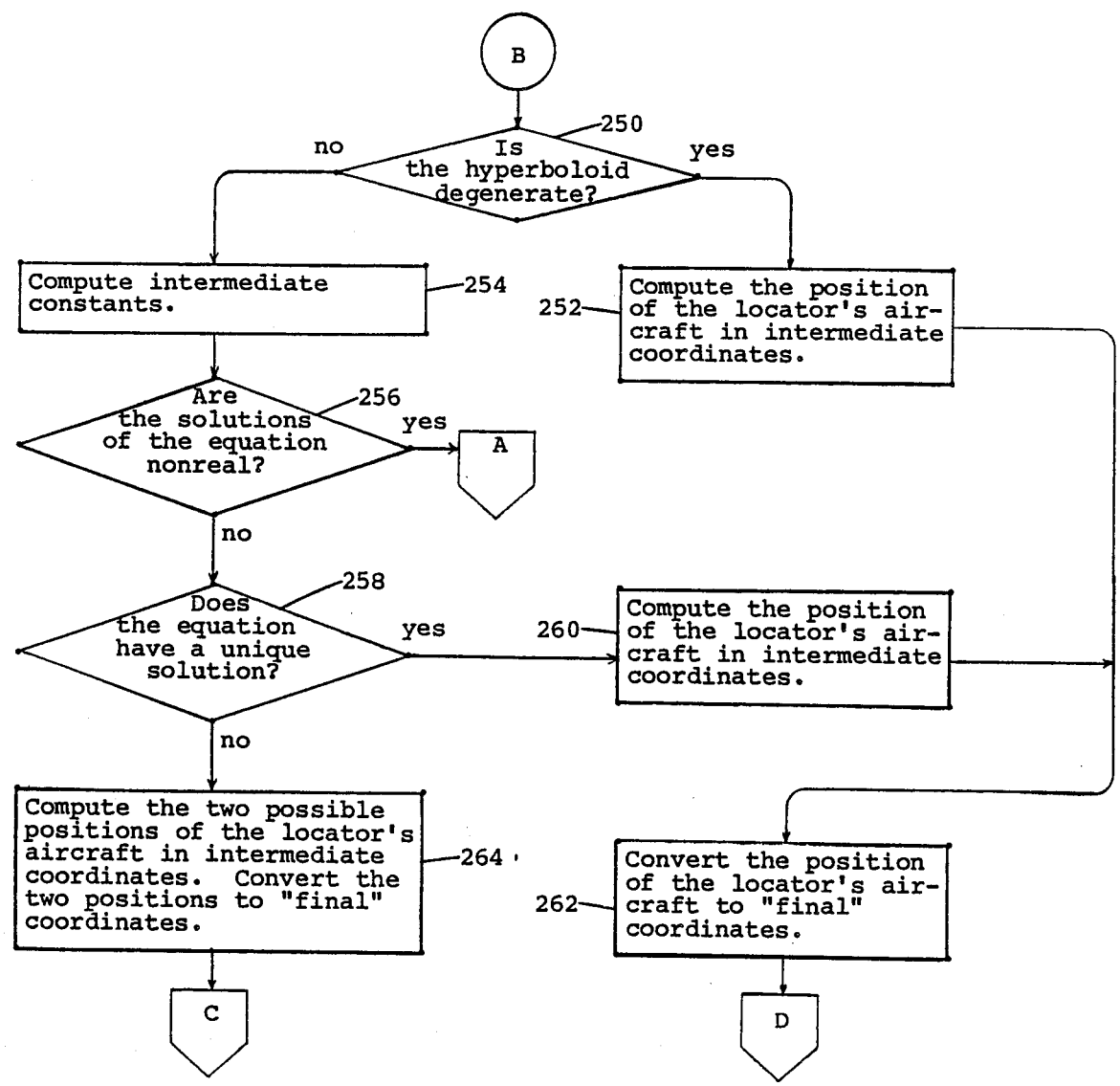
FIG. 18 (2 OF 3)

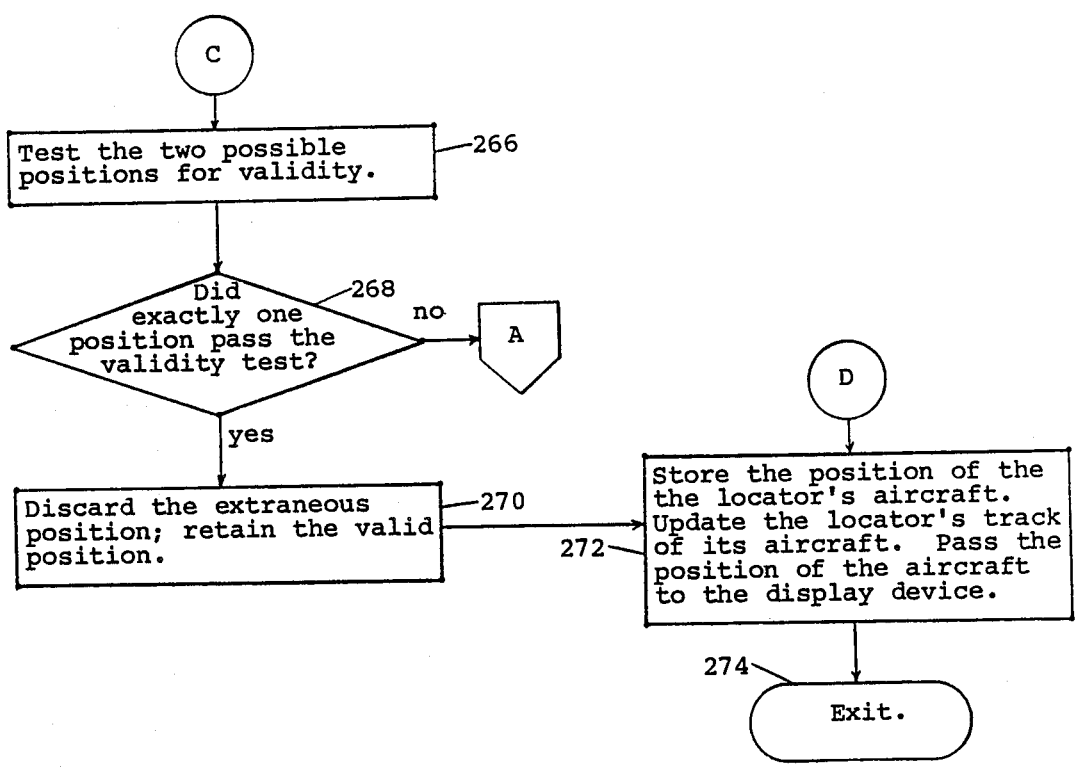
FIG. 18. (3 OF 3)

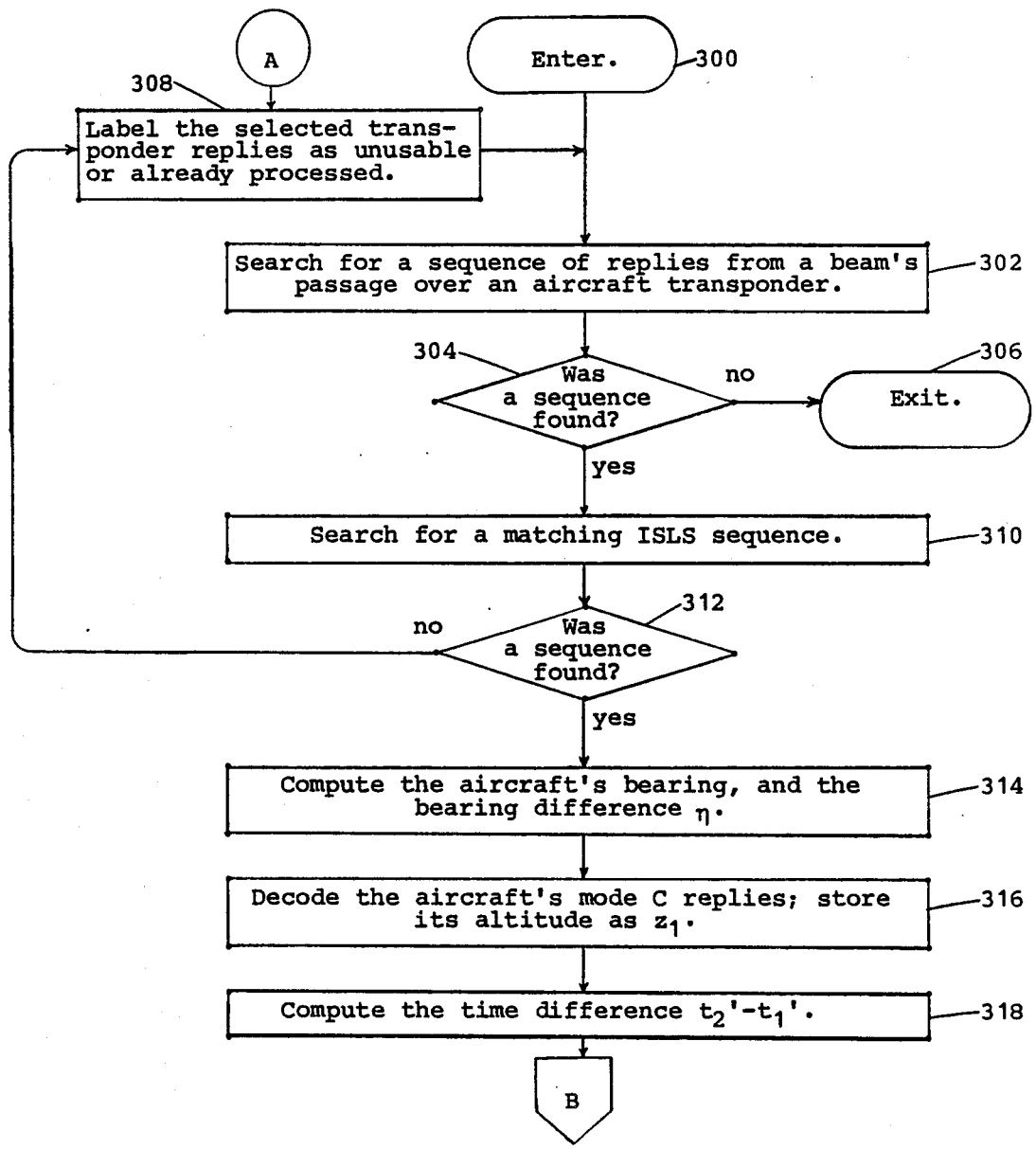

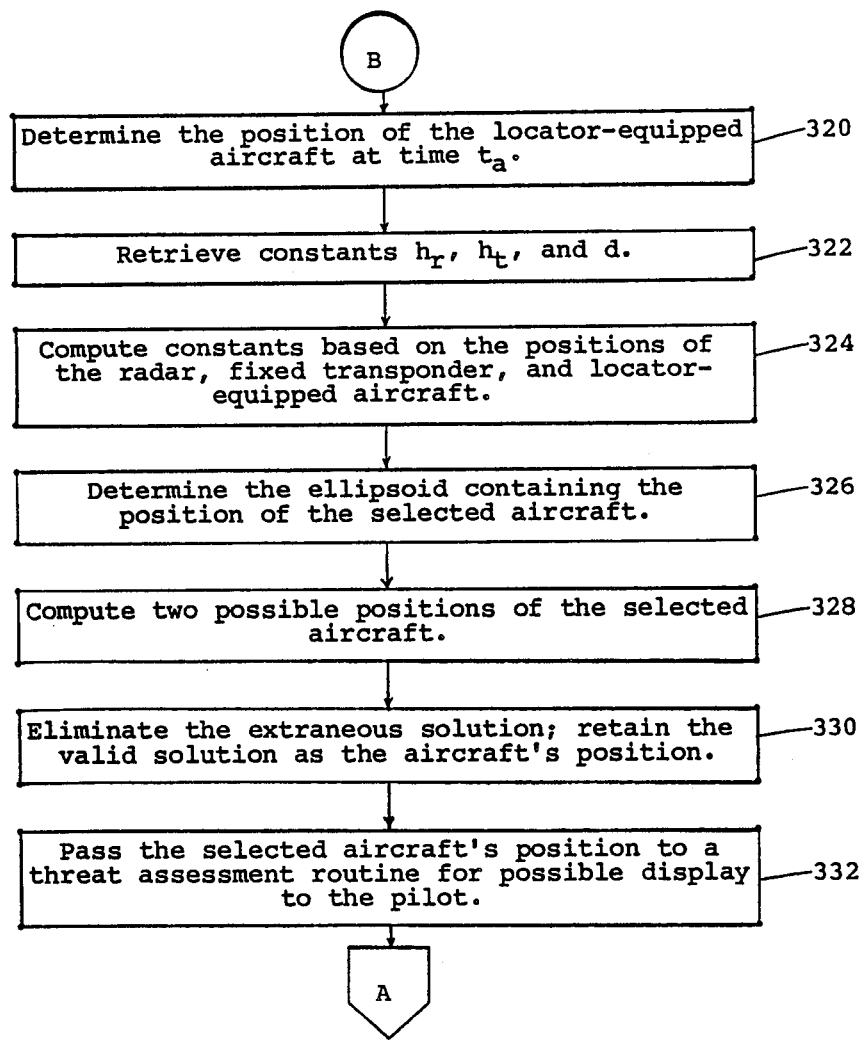
FIG. 19. (2 OF 2)

METHOD AND APPARATUS FOR PASSIVE AIRBORNE COLLISION AVOIDANCE AND NAVIGATION

The invention described herein was made by an employee of the Government of the United States of America and may be manufactured and used by or for the Government for governmental purposes without the payment of royalties thereon or therefor.

BACKGROUND OF THE INVENTION

1. Field of the Invention

The present invention concerns navigation and collision-avoidance of aircraft, and particularly a method of using an on-board locating system to passively compute, monitor, and display the positions of own and other aircraft.

2. Description of Prior Art

The need for airborne devices to help pilots avoid midair collisions has been recognized for several years. The July-August 1984 edition of "FAA General Aviation News" reported that "over the past quarter century, midairs have averaged over 25 per year, with an overall total of 1550 fatalities... In 1982, the latest year for which the National Transportation Safety Board has complete figures, there were 36 midairs, resulting in 59 fatalities." Most midair collisions involve military or general aviation aircraft. Those that involve commercial flights, such as the Sept. 25, 1978 collision over San Diego Calif., which resulted in 144 deaths, typically attract the greatest coverage by the news media.

An early airborne collision-avoidance system, proposed in the 1970s, was not accepted by the Federal Aviation Administration (FAA), largely because it would have protected appropriately equipped aircraft only from other aircraft carrying a similar collision-avoidance device. Instead, the FAA concentrated its efforts on systems that rely on detecting aircraft equipped with secondary radar transponders. More than half of the U.S. civil aviation fleet is transponder-equipped; and most of the flying done in the United States is done by transponder-equipped craft. Therefore, a collision-avoidance device that detects proximate transponder-equipped aircraft can protect its own aircraft from a large number of others. The invention described herein also follows this approach, in that it relies on the existing secondary radar system to provide electromagnetic signals which allow any suitably equipped aircraft to passively detect transponder-equipped aircraft that are close to it.

Secondary radars, also called beacon radars, have been used for many years to gather surveillance data for air traffic controllers. Within the FAA they are formally known as Air Traffic Control Beacon Interrogators (ATCBI). There are several types, the ATCBI-3, ATCBI-4, and ATCBI-5 currently being used. Each differs from the others in details depending mainly on the manufacturer and the technology available at the time of its design. Internationally, beacon radars are formally known as "secondary surveillance radars." The United States standards for secondary radars and the airborne transponders that work with them are given by the *U.S. National Standard for Mark X (SIF) Air Traffic Control Radar-Beacon System Characteristics*, which is attachment 1 to Federal Aviation Administration Order 1010.51A. The international standards for secondary radars and transponders are in Volume 1 of Annex 10 to the International Civil Aviation Organization (ICAO) Convention. The U.S. standards agree with the international standards. The well-known reference *Radar Handbook*, edited by Merrill I. Skolnik (McGraw-Hill Book Company Inc., 1970; Library of Congress catalogue card number 69-13615) includes a description of the secondary radar system as its chapter 38, "Beacons."

Secondary radars should not be confused with primary radars. The two are frequently co-located; their outputs are often combined before being transmitted to a computerized air traffic control facility; they occasionally even use the same antenna. However, they operate by different principles, and are designed and built differently. A primary radar periodically transmits a very powerful pulse of rf energy, and then detects targets by receiving their reflections of the transmitted pulse. A secondary radar periodically transmits a pair of rf pulses at relatively low power. When an aircraft transponder receives the pulse pair, it replies with a train of rf pulses that are then received by the secondary radar. The secondary radar system is thus a cooperative system. Primary radars can be used to detect non-cooperating targets, such as enemy aircraft, civil aircraft without transponders, and severe storms. Though useful for defense, weather detection, and air traffic control, primary radars are not relevant to the present invention. Therefore, any further reference herein to a radar signifies a secondary radar. The following material summarizes the operation of the secondary radar system as presently used, illustrating the relationships between groundbased radars and airborne transponders.

FIG. 1 depicts an aircraft equipped with a secondary radar transponder, 10. The aircraft is flying in the vicinity of a radar, 12. Directional antenna 14 of radar 12 rotates continuously about a vertical axis at a uniform rate. Rotation rates (scan rates) such as 5 or 6 revolutions per minute (rpm) are typical for long-range radars, having ranges of approximately 200 nautical miles. Scan rates such as 12 or 15 rpm are typical for terminal area radars, having ranges of approximately 60 nautical miles. As antenna 14 rotates, it emits a pulsed beam 16 of electromagnetic radiation at a frequency of 1030 MHz. The beam consists of interrogating pulse pairs 18 (interrogations), transmitted at a predetermined average pulse repetition frequency (prf), typically between 300 and 450 interrogations per second. (Some of the newest models of secondary radar, those with "monopulse" antennas and processors, will operate at lower prf, typically 150 interrogations per second.) The horizontal beam width is typically between 2.5 degrees and 3.5 degrees, measured at the half-power points. An interrogation 18 consists of pulses named P1 and P3, also shown in FIG. 2. Each pulse lasts 0.8 microseconds; and the leading edge of pulse P3 follows that of pulse P1 by either 8 or 21 microseconds. Interrogations with 8-microsecond spacing are called mode A interrogations; those with 21-microsecond spacing are called mode C interrogations.

An aircraft transponder determines the mode of an interrogation by measuring the time between the 1030 MHz pulses it receives. When the transponder receives a mode A interrogation, it replies with a code representing its aircraft's identity. When it receives a mode C interrogation, it replies with a code representing its aircraft's altitude. A beacon radar's interrogations follow a repeated mode interlace pattern, such as alternating mode A and mode C interrogations, or two consecutive mode A interrogations followed by a mode C interrogation.

In FIG. 1, aircraft transponder 10 will reply to beacon-radar interrogation 18, 3 microseconds after receiving the leading edge of the P3 pulse. That 3-microsecond time is part of the transponder's "turnaround" time, herein called $t_t$. The reply consists of electromagnetic pulses, omnidirectionally transmitted at a frequency of 1090 MHz from the aircraft's transponder. FIG. 3 shows a typical train of such pulses, and in particular, shows the framing pulses, F1 and F2, which are always present in the reply, their leading edges spaced 20.3 microseconds apart.

The presence or absence of a pulse in each of twelve defined positions between the framing pulses (the "X" position shown in FIG. 3 is not used by civil aviation transponders) determines one bit of information in the aircraft's coded reply. The reply thus consists of twelve bits, which are normally viewed as being grouped into 4 octal digits called A, B, C, and D. The transmitted code is the 4-digit sequence ABCD. In FIG. 3, the numerical suffix of each pulse position indicates the contribution to the value of its octal digit made by the presence of a pulse in that position. For example, the presence of pulses in positions B1 and B4, and the absence of a pulse in position B2, indicates that the value of octal digit B is $1\times1+0\times2+1\times4=5$. All reply pulses are 0.45 microseconds long. Adjacent position are separated by 1 microsecond. Thus, in FIG. 3, the leading edge of the C4 pulse follows that of the A2 pulse by 1.45 microseconds; likewise the leading edges of the B4 and D2 pulses are 1.45 microseconds apart.

Antenna 14 in FIG. 1 rotates in a clockwise direction as shown by arrow 20, and irradiates objects with beam 16. The time during which beam 16 irradiates an object is known as the beam dwell, and depends primarily on the rotation rate and the beam width. A 3-degree radar beam rotating at the rate of 4 seconds per revolution will irradiate a transponder for 1/30 second during each revolution. If the prf is, for example, 300 interrogations per second, then the transponder will be interrogated approximately 10 times during the beam dwell. In practice, the beam width that a transponder "experiences" varies somewhat, depending on such factors as the radar's output power and the transponder's sensitivity.

FIG. 1 shows that each time radar 12 emits an interrogation, it also omnidirectionally transmits a pair of pulses 22 for "improved sidelobe suppression" (ISLS). (Formerly a separate antenna was used to transmit the ISLS pair; however, the FAA's newest beacon radar antenna, the "five-foot open array," formally known as type FA-9764, transmits both the directional interrogation 18 and the omnidirectional ISLS pair 22.) The pulses in the ISLS pair are called P1 and P2; and the ISLS P1 pulse is transmitted simultaneously with the interrogation P1 pulse. As shown in FIG. 4, each pulse lasts 0.8 microseconds; and the leading edge of the P2 pulse follows that of the P1 pulse by 2 microseconds. P1 and P2 have the same amplitude, which must at least equal the amplitudes of pulses transmitted by the strongest sidelobe of directional beam 16.

The ISLS pulse pair is transmitted to eliminate unwanted transponder replies, which can be triggered by a transponder's receipt of either a sidelobe of interrogating beam 16, or a reflection of beam 16. Both the U.S. and international standards for secondary radar require transponders to compare the amplitudes of received pulses, and loc up for 35 microseconds unless P1 is significantly stronger than P2.

A transponder directly interrogated by beam 16 will receive P1 at much greater amplitude than P2, because of the far greater gain of directional beam 16. The transponder will therefore reply normally.

A transponder receiving a sidelobe of beam 16 will find the amplitude of P2 to be at least that of P1, and will lock up. A transponder receiving a reflection of beam 16 will have already received the simultaneous ISLS transmission, since the reflection must have traveled farther to reach the transponder. Having found P1 and P2 to be of equal amplitude, the transponder will have locked up, and be incapable of replying to the reflection.

There are many places where an aircraft may be in overlapping coverage areas of several secondary radars. At times, an aircraft may be in the surveillance beams, 16, of two or more of those radars. When a transponder determines that it has received an interrogation, it ignores all other interrogations that may reach it until it has completed its reply. Thus if the interrogations from one radar arrive at a transponder a few microseconds before those of a second radar, the first radar prevents the transponder from replying to the second. In fact, the second radar is likely to receive the transponder's replies to the first radar's interrogations, and, basing its computation on the time it transmitted its own interrogation, miscalculate the distance from itself to the aircraft.

Two techniques are often used to prevent such interference problems. In the United States, the FAA varies the pulse repetition frequency (prf) of neighboring radars, so that their interrogations are not synchronous. Therefore, even if a particular interrogation from one radar prevents a reply to an interrogation from a second radar, their next few interrogations will reach the aircraft sufficiently separated in time to avoid locking out each other.

The other technique, also used by the FAA, extends this approach by changing the interpulse period—i.e. by "staggering" the interrogations. A radar with a prf of, for example, 400 interrogations per second, has an average inter-interrogation period of 1/400 second, or 2500 microseconds. Over a long period of time, the radar maintains that average prf; however, over a time in which, for example, 6 or 7 interrogations are transmitted, the time between successive P1 pulses can vary from, for example, 1800 microseconds to 4000 microseconds. The variation follows a fixed pattern, the "stagger pattern," which is continually repeated. Neighboring radars use different patterns. Therefore, even if two radars' beams illuminate a transponder during the same period, their interrogations will not be synchronous, and both will receive replies from the transponder.

In order to monitor the performance of a beacon radar, the FAA frequently installs a transponder on a conveniently located building or tower, where it is "visible" to the radar. The transponder's position is fixed and known, and technicians can monitor the radar's reports of the transponder's position. If the reports disagree with the known position, technicians can then check the radar to determine if its operation is faulty. The present invention also uses transponders fixed in positions visible to beacon radars; however it uses them for an entirely different purpose.

Work on airborne collision-avoidance devices has been underway for several years, most of it sponsored or performed by the FAA and its contractors. In June 1981, the Administrator of the FAA, Mr. J. Lynn Helms, publicly announced that the FAA would establish standards for two levels of airborne collision-avoidance devices, which became known as Traffic Alert and Collision Avoidance Systems (TCAS). The TCAS-I would be designed to operate in most general aviation aircraft, while the more sophisticated and more expensive TCAS-II would be designed for airliners and high-performance general aviation craft. In his announcement that the FAA would promulgate TCAS minimum standards, Mr. Helms encouraged private industry to not only build equipment meeting those standards, but also to incorporate improvements compatible with them. The present invention consists of a method and an apparatus that are entirely compatible with the standards established to date by the FAA and major avionics manufacturers. The FAA and the manufacturers have worked together through the Radio Technical Commission for Aeronautics (RTCA). The *TCAS-I Functional Guidelines* is document RTCA/DO-184; and the *Minimum Operational Performance Standards for Traffic Alert and Collision Avoidance System Airborne Equipment* is document RTCA/DO-185 (2 volumes). The *U.S. National Aviation Standard for the Traffic Alert and Collision Avoidance System II* is FAA Order 6367.1.

In its simplest form, the TCAS-I operates passively in its detection of another aircraft. It receives the other aircraft's transponder replies to secondary radar interrogations, and estimates the other aircraft's distance from itself by measuring the strength of the replies. A device using this principle was available during the 1970s, but was not widely accepted by the aviation community. Distance measurement by this method is not very accurate. Another limitation of the simplest form of TCAS-I is that it will not offer the pilot any directional guidance to help him locate threatening aircraft. The method described herein will locate aircraft with an accuracy comparable to that of the secondary radar system, thus overcoming major shortcomings of TCAS-I.

The TCAS-II developed by the FAA will utilize a directional antenna to interrogate other aircraft, operating essentially as an airborne secondary radar. While this method of operation will enable it to accurately measure the distance from its own aircraft to a proximate transponder-equipped aircraft, the directional information obtained by the minimum TCAS-II will only be accurate to between five and ten degrees. That accuracy is not considered sufficient for computation of horizontal collision-avoidance maneuvers. The enhanced TCAS-II, using a more sophisticated and more expensive antenna, should achieve two-degree accuracy. The invention described herein, utilizing information based on the existing secondary radar system, can be expected to obtain the bearing of a proximate aircraft with greater accuracy than that of the minimum TCAS-II. It may also surpass the directional accuracy of the enhanced TCAS-II. While achieving excellent directional accuracy, the invention, described herein, will avoid the large cost—expected to be several thousand dollars—of the TCAS-II's directional antenna.

Because each TCAS-II and each enhanced "active" TCAS-I acts as an airborne secondary radar, issuing interrogations and eliciting responses from aircraft in its vicinity, its use is expected to increase the rate of false targets received by the ground-based secondary radars which supply surveillance data to air traffic controllers. As terminal area radars are generally located at airports, and as the airspace surrounding airports is generally the most crowded, this interference is apt to be worst for radars at busy terminals, where the potential for mid-air collision is greatest, and where it is most critical that air traffic controllers receive high quality radar data. The FAA has attempted to limit this unwanted side effect of active TCAS operation by limiting TCAS transmissions in congested airspace, and predicts that the decline in performance of ground-based secondary radars will not be unacceptable. Because the avionics used in the method described herein is entirely passive, use of the invention would not in any way increase the false target rate experienced by secondary radars. Thus the invented method could be used instead of active techniques, or as a supplement to active techniques, to avoid the degradation of the air traffic control system that could be caused by simultaneous operation of many active TCAS units in densely populated airspace.

In summary, the passive systems heretofore developed are incapable of providing sufficient accuracy to operate without a prohibitively annoying "false alarm" rate, and are unlikely to meet with acceptance by the aviation community. The active systems heretofore developed must limit their operation in precisely those areas where collision avoidance service is most needed, the crowded airspace in the vicinity of airports; and those providing angular guidance will be available only at a cost so high as to discourage their purchase by the overwhelming majority of aircraft owners. The invention described herein would provide needed accuracy without increasing frequency congestion in terminal areas. Its compatibility with the FAA-developed TCAS allows it to be applied whenever or wherever it may be desirable to do so; and in principle, all hardware, software, installation and maintenance costs of its application could be supported by the private sector. By taking advantage of the technology of the existing secondary radar system through a novel utilization of proven hardware components, the invention provides collision avoidance service at a cost low enough to encourage its public acceptance.

SUMMARY OF THE INVENTION

An object of the present invention is to provide a method for passively determining the position of own aircraft with respect to a secondary surveillance radar transmitting ISLS signals and a ground transponder system, associated with said radar, transmitting reply signals in response to interrogating signals from said radar, and to provide said position information for display to be used for navigation purposes.

Another object of the present invention is to repetitiously compute own aircraft's instantaneous position by use of hyperbolic and linear functions related to own aircraft, said radar, and said associated transponder system.

A further object of the present invention is to provide a method for passively determining the position of another aircraft with respect to own aircraft, when a transponder in said other aircraft replies to interrogations matched to ISLS signals transmitted by said radar, and to provide said position information for display, to be used for collision-avoidance purposes.

A still further object of the present invention is to repetitiously compute said other aircraft instantaneous positions by use of elliptic and linear functions related to own aircraft, said other aircraft, and said radar.

These and other objects and advantages will become more apparent from the detailed description thereof taken with the accompanying drawings.

BRIEF DESCRIPTION OF THE DRAWINGS

FIG. 8a 2 shows a condition in which a real solution for the position of the locator's own aircraft is not obtainable.

FIG. 16 shows the routine by which the computer maintains the locator's environmental data base.

FIG. 17 shows the routine by which the computer determines the azimuth of its own aircraft with respect to a radar.

FIG. 18 (3 pages) summarizes the routine by which the computer determines the position of its own aircraft in a 3-dimensional coordinate system based on the positions of a radar and an associated fixed transponder.

FIG. 19 (2 pages) summarizes the routine by which the computer determines the position of another aircraft in a 3-dimensional coordinate system based on the positions of a radar and an associated fixed transponder.

DESCRIPTION OF THE PREFERRED EMBODIMENT

Figure 5:
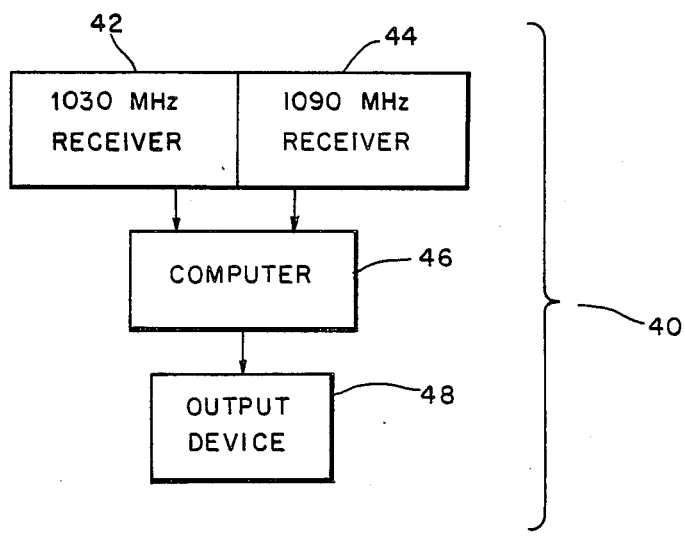
FIG. 5 shows a locator, consisting of 1030 MHz receiver, 1090 MHz receiver, computer, and output device.
Figure 7:
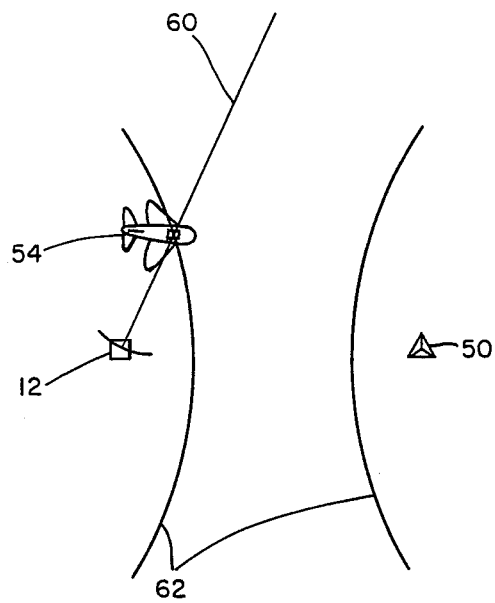
FIG. 7 shows the positions of the radar, fixed transponder, and locator's own aircraft with respect to a hyperbola and a ray determined by the locator.

The locator 40 shown in FIG. 5 is installed on-board its own aircraft, and comprises a 1030 MHz receiver 42, a 1090 MHz receiver 44, a computer 46, and an output device 48. Receiver 42 receives and processes interrogations and ISLS transmissions emanating from secondary surveillance radars. Receiver 44 receives and processes transponder replies to said interrogations. Both receivers 42 and 44 digitize and decode the pulse trains they receive and pass them to computer 46. Computer 46 computes its own aircraft's position, and the positions of transponder-equipped aircraft in the vicinity of its own aircraft. The positions of said aircraft are passed to output device 48 by said computer, for display to the pilot. The pilot may use the simultaneous display of said positions for collision-avoidance purposes, and may also use said display of his own aircraft's position for navigational purposes.

Each of the major components shown in FIG. 5 is a well-known device. The invention comprises a novel utilization of the components of the locator, as well as of other devices, rather than involving any novelty in the hardware components themselves: Receiver 42 largely performs the functions of the 1030 MHz receiver in a typical secondary radar transponder, and receiver 44 largely performs the functions of a radar's 1090 MHz receiver. The well-known reference *Introduction to Radar Systems*, by Merrill I. Skolnik (McGraw Hill Book Company, Inc., 1962; Library of Congress catalogue card number 61-17675) illustrates the 1030 MHz receiver and the 1090 MHz receiver in FIG. 13.8, "Block diagram of the ATC beacon system." The functions of receivers 42 and 44 are described in detail hereinbelow. Computer 46 and output device 48 can be any of several commercially available models. For example, the output device could be a cathode ray tube display, or some other kind of rapidly updated visual display.

The invention can be applied in the coverage area of a beacon radar having at least one fixed transponder able to receive interrogations only from that radar. A transponder could be limited in such a manner by, for example, equipping it with a highly directional antenna. The transponder's replies, on the other hand, are transmitted omnidirectionally. So that locator-equipped aircraft may unambiguously identify fixed transponders by their identity codes, each fixed transponder's identity must be permanently established; it must be different from the identity of any other fixed transponder in its vicinity (i.e. close enough for an aircraft to simultaneously hear replies from both of them); and no aircraft may be permitted to use that identity code.

The locator's computer, 46, maintains a file of information on secondary radars and their associated fixed transponders. For each radar, computer 46 stores:

(1) its location, in three dimensions;
(2) its scan rate;
(3) its pulse repetition frequency (prf);
(4) its stagger pattern (if any);
(5) its mode A–mode C interlace pattern;
(6) the identity code and three-dimensional location of each fixed transponder associated with it.

Of these data, the radar and transponder locations, and the transponder identity codes, must be prestored. The remaining information is calculated by computer 46, although it can also be prestored and later verified by the computer. In particular, by knowing the locations of a radar and each of its fixed transponders, computer 46 also knows each such transponder's bearing and distance from its radar.

Figure 6:
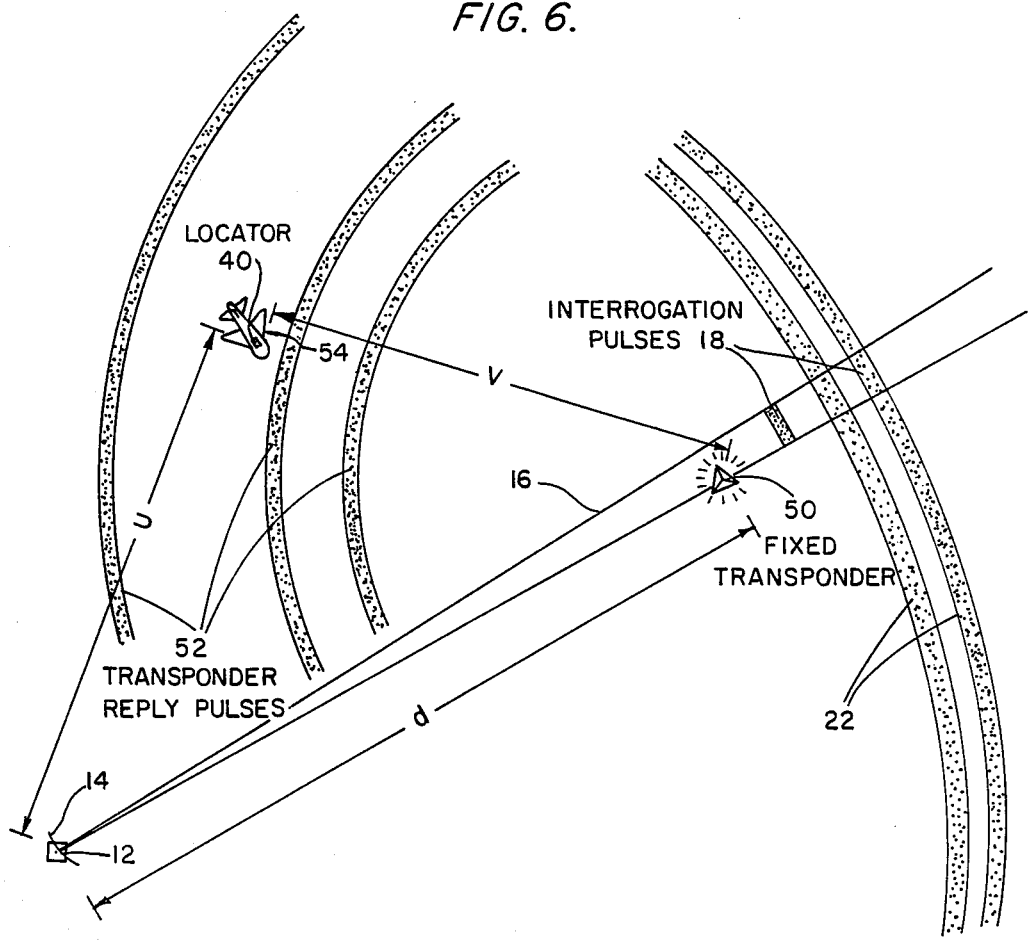
FIG. 6 shows a radar transmitting an interrogation and an ISLS pulse pair, a fixed transponder omnidirectionally transmitting a train of reply pulses in response to the interrogation, a locator's own aircraft, and the distances between the radar, transponder, and aircraft.

FIG. 6 (not drawn to scale) shows a fixed transponder 50, which has just replied to mode A interrogation 18 issued by radar 12. Pulses 52 are part of the train of reply pulses by which the fixed transponder's identity is encoded. Locator 40 in aircraft 54 "hears" the transponder's reply on its 1090 MHz receiver 44. Receiver 44 decodes the reply, records the time the leading edge of its F1 pulse was received, and passes the time and decoded reply to computer 46. The computer checks the identity code against its file of fixed transponder identities, and eventually finds a match. During the short period in which radar beam 16 passes over fixed transponder 50, the transponder is interrogated several times, the number of interrogations being typically between 10 and 20. Computer 46 records the times receiver 44 heard replies from those interrogations, and by averaging, estimates the time the center of beam 16 passed over fixed transponder 50. Since its data file includes a record of the fixed transponder's bearing from the radar, computer 46 thus obtains a very accurate estimate of the direction of antenna 14 at the time beam 16 passed over the fixed transponder. By measuring the time between successive passages of the center of beam 16 over fixed transponder 50, computer 46 determines or reverifies the antenna's scan rate.

Within this application, the words "bearing" and "azimuth" are both used to describe the direction of an object—typically an aircraft or a fixed transponder—from a radar. As is conventional in the field of navigation, the direction is a horizontal angle measured clockwise from north.

Knowing the position of antenna 14 at a particular time, and knowing its scan rate, allows computer 46 to accurately estimate the direction of surveillance beam 16 at any future time. In particular, every time 1030 MHz receiver 42 "hears" a sequence of interrogations, indicating that beam 16 is passing over it, computer 46 determines the bearing of its own aircraft, 54, with respect to radar 12. Likewise, whenever 1090 "hears" a sequence of replies from an aircraft's transponder, computer 46 determines that particular aircraft's bearing with respect to radar 12. (In both determinations, computer 46 utilizes its filed or previously determined information on the radar's stagger pattern and mode interlace pattern: in the former case, to verify that the interrogations emanated from that particular radar; in the latter case, to verify that the transponder replies were in response to interrogations from that particular radar.) Locator 40 therefore updates its bearing determinations roughly once per scan—for examples, approximately once every 5 seconds if radar 12 is a terminal radar, or approximately once every 10 seconds if radar 12 is a long-range radar.

The bearing of aircraft 54 from radar 12 is the first of two important geometric facts that determine the aircraft's actual position. The second fact is determined by a comparison of the times locator 40 receives two omnidirectionally transmitted signals. In FIG. 6, the distance from radar 12 to fixed transponder 50 is denoted d; the distances from radar 12 to aircraft 54, and from transponder 50 to aircraft 54, are respectively denoted U and V. Note that FIG. 6 shows the plane determined by the locations of radar 12, transponder 50, and aircraft 54. If the distances U, V, and d are more than a few miles, then the altitude differences between the three locations are relatively insignificant, and the plane of FIG. 6 approximates the earth's surface. Though not shown in FIGS. 6, 7, 8, 9, and 10, altitude differences are fully addressed in the explanation of the locator's operation, which follows herein.

As surveillance beam 16 passes over fixed transponder 50, radar 12 continues to emit interrogation pulse pairs. Suppose that a mode A interrogation 18 is emitted at a time $t_0$. At that time, the first pulse of a pair of omnidirectional side lobe suppression pulses 22 is also emitted. Let $t_1$ denote the time at which the locator's 1030 MHz receiver 42 hears the leading edge of P1, the first ISLS pulse. Let $t_2$ denote the time the locator receiver 44 hears the leading edge of F1, the first pulse of the omnidirectional reply 52 issued by transponder 50 in response to interrogation 18. Let $t_t$ denote the transponder's "turnaround time," the time from its receipt of the leading edge of the P1 pulse of interrogation 18, until its broadcast of the F1 pulse of its reply 52. Let c denote (as usual) the propagation speed of electromagnetic radiation. Then $U = c(t_1 - t_0)$ and $d + V = c(t_2 - t_0 - t_t)$. From these two equations it follows immediately that $V - U = c(t_2 - t_1 - t_t) - d$. The times $t_2$ and $t_1$ are measured by locator 40; the time $t_t$ is a constant based on established U.S. and international standards; the distance d is stored in the memory of computer 46, or is computed from the stored positions of radar 12 and transponder 50. Thus computer 46 calculates the difference $V - U$.

The set of all points in a plane, the difference of whose distances from two fixed points is a positive constant less than the distance between the fixed points, is, by definition, a hyperbola. The calculation of $V - U$ therefore determines a particular hyperbola on which aircraft 54 is located. Note that the fixed points are the locations of radar 12 and transponder 50; the constant is either $U - V$ or $V - U$, whichever is positive. In the event that $U = V$, the hyperbola degenerates to a straight line: in particular, to the perpendicular bisector of the line segment connecting radar 12 and fixed transponder 50.

Since the bearing of aircraft 54 from radar 12 is also known, its position is nearly determined. That is, referring to FIG. 7, aircraft 54 lies on a known ray 60 emanating from radar 12, and also lies on a known hyperbola 62. Its location therefore satisfies both a linear equation with an associated inequality, representing the ray, and a quadratic equation representing the hyperbola. Solving these equations is a routine computation, done by computer 46, yielding in principle either one real solution or two real solutions. In practice it would also be possible to obtain no real solutions. FIGS. 8, (a), (b), and (c), illustrate these situations.

Figure 8A:
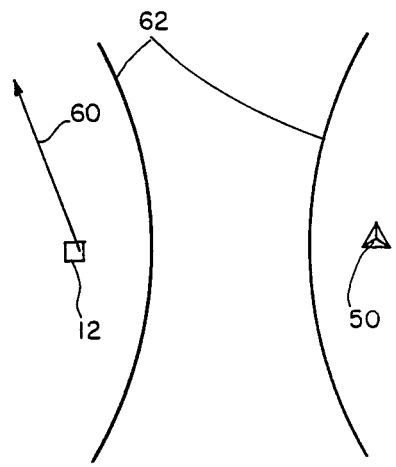

If computer 46 does not obtain a real solution, as shown in FIG. 8(a), an error has occurred in data acquisition or computation. Locator 40 discards the input data; and when it later acquires new data, either from the same sources, or from some other fixed transponder associated with radar 12 (if another one exists), it redoes the computation with the new data.

Figure 8B:
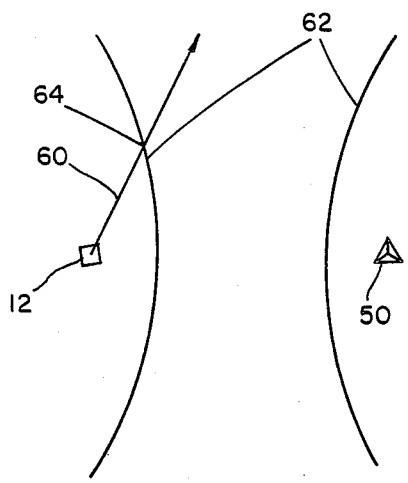
FIG. 8b shows a condition in which exactly one real solution for the position of the locator's own aircraft is obtained.

If computer 46 obtains exactly one real solution 64, as shown in FIG. 8(b), the position of aircraft 54 is uniquely determined.

Figure 8C:
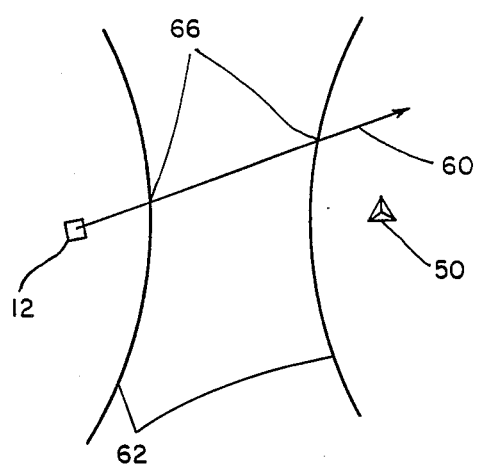
FIG. 8c shows a condition in which two real solutions for the position of the locator's own aircraft are initially obtained.

If the computation yields two real solutions 66, as shown in FIG. 8(c), locator 40 must determine which of them represents the true position of aircraft 54. The way it does so is an application of the same method, described in the following paragraphs, that it uses to determine the positions of aircraft other than its own. In particular, computer 46 temporarily assumes its aircraft 54 to be at each of the two possible positions 66. Basing its calculation on each of the assumed positions of aircraft 54, computer 46 twice calculates the position of fixed transponder 50, as if it were a transponder on another aircraft. Computer 46 has stored the actual position of fixed transponder 50, and it compares its two calculated positions to the actual position. One of the calculations, being based on an erroneous location for aircraft 54, will have yielded the wrong answer, i.e. the wrong position for fixed transponder 50. The other calculation, being based on the true position of aircraft 54, will have produced the right answer. Computer 46 discards whichever of the solutions 66 has been shown to be erroneous, and retains the valid solution as the true position of aircraft 54. It reports the true position to the pilot through output device 48, and also uses it to initiate or update a track of aircraft 54. The location of aircraft 54 is used, as next described, in computing the positions of transponder-equipped aircraft.

Figure 9:
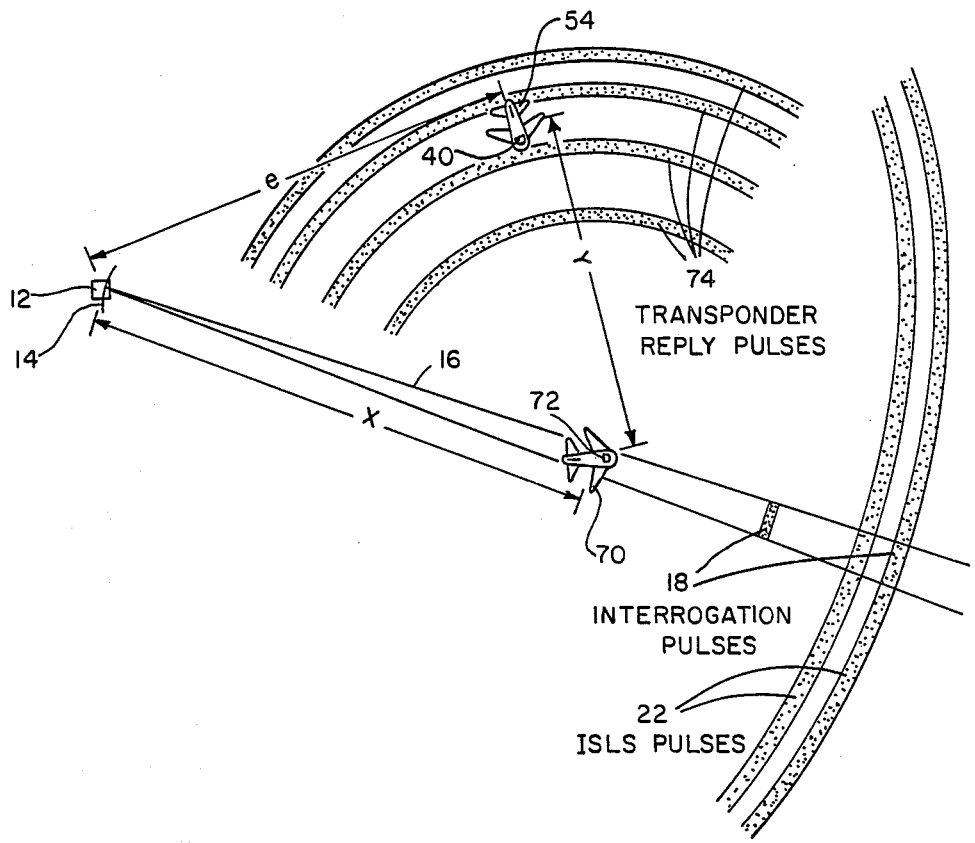
FIG. 9 shows a radar transmitting an interrogation and an ISLS pulse pair, the locator's own aircraft and another aircraft, the omnidirectionally transmitted reply of the other aircraft's transponder in response to the interrogation, and the distances between the radar, the locator's own aircraft, and the other aircraft.

FIG. 9 shows aircraft 54, equipped with locator 40, flying in the vicinity of radar 12. It also shows another aircraft 70, equipped with transponder 72, flying in the vicinity of radar 12. At time $t_0'$, radar 12 issues mode A interrogation 18, which transponder 72 receives, and to which it replies with its identity, coded into pulse train 74, four pulses of which are shown in FIG. 9. At time $t_0'$ radar 12 also transmits, omnidirectionally, the P1 pulse of ISLS pulse pair 22. The locator's 1030 MHz receiver 42 receives the ISLS pair, and records the time $t_1'$ at which it received the leading edge of P1. The locator's 1090 MHz receiver 44 receives reply train 74, omnidirectionally transmitted by transponder 72, and records the time $t_2'$ at which it received the leading edge of F1, the first pulse of the reply. Receivers 42 and 44 respectively pass times $t_1'$ and $t_2'$ to computer 46. As before, let $t_t$ denote the "turnaround time" of transponder 72, the time between its receipt of the leading edge of P1 and its transmission of F1.

In FIG. 9, e denotes the distance between radar 12 and locator-equipped aircraft 54; X denotes the distance between radar 12 and transponder-equipped aircraft 70; and Y denotes the distance between the two aircraft.

Because computer 46 has determined the position of its own aircraft, as described above, and has also prestored the position of radar 12, it can compute e, the distance between the aircraft and the radar. Having computed e and stored the time $t_1'$, computer 46 then computes $t_0'$: $t_0' = t_1' - e/c$. (As before, c denotes the speed of electromagnetic propagation.) Computer 46 then computes the sum $X+Y$: $X+Y = c(t_2' - t_0' - t_t)$.

Figure 10:
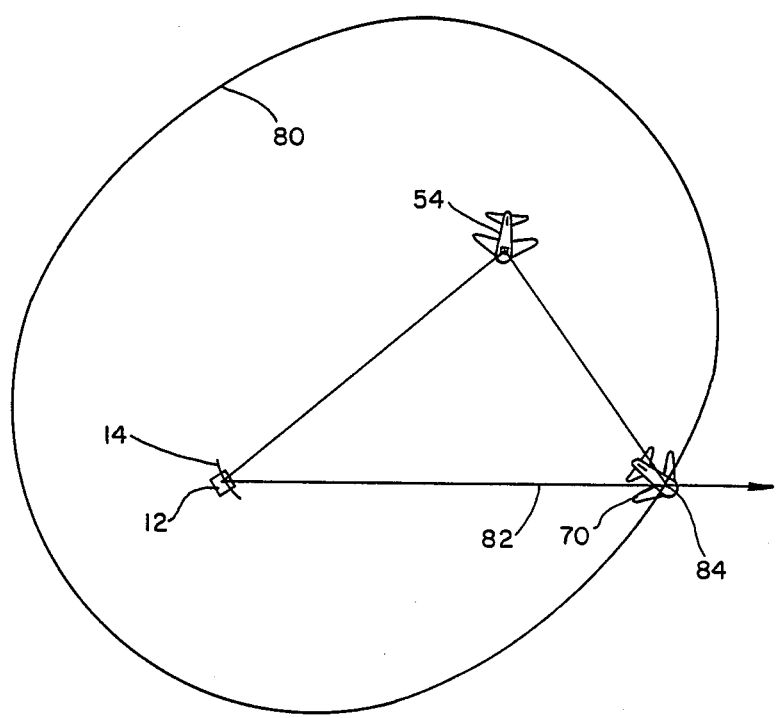
FIG. 10 shows the positions of the radar, the locator's own aircraft, and the other aircraft with respect to an ellipse and a ray determined by the locator.

The set of all points in a plane, the sum of whose distances from two fixed points is a constant, is by definition an ellipse. The computer's calculation of $X+Y$ therefore determines a particular ellipse, 80 in FIG. 10, one of whose points represents the position of aircraft 70. The foci of that ellipse are the locations of radar 12 and locator-equipped aircraft 54. Locator 40, having continually monitored the direction of the radar's surveillance beam, computes the bearing of aircraft 70 with respect to radar 12. As shown in FIG. 10, the intersection of the ellipse 80 and the ray 82, representing that bearing, is necsssarily the position 84 of aircraft 70. It is the unique simultaneous solution of two equations: the quadratic equation representing ellipse 80, and the linear equation, with associated inequality, representing ray 82. Computer 46 performs the calculations which yield the solution.

Computer 46 then uses the result of its computation of the position of aircraft 70 to initiate or update a track of the aircraft. In the event that aircraft 70 is close to the locator's own aircraft 54, computer 46 passes the current position of aircraft 70 to output device 48, which displays it to the pilot. Tracking routines, threat detection routines, and display technologies are well-known; the invented method does not depend on any particular processing routine or technology.

The locator determines its aircraft's position to be the intersection of a ray and a branch of a hyperbola. If the ray and the hyperbola intersect at approximately right angles, the position determination will be susceptible to only very slight errors. If, on the other hand, the ray and the hyperbola intersect at a very small angle, then an inaccuracy in determination of either of them could cause a larger error in the computed position.

A simple solution to this problem is to install more than one fixed transponder for each radar, the transponders being scattered in various directions from the radar. In practice, the number of transponders to be used with any particular radar would be decided by engineering studies; however it seems likely that three or four would generally suffice. The description of the locator given herein accounts for the possibility that several fixed transponders may be associated with one radar. The tracking routine used in the locator should be able to recognize which fixed transponder currently yields the most accurate position determination for aircraft 54. It could do so, for example, by comparing the aircraft's most recently determined position to a prestored or precomputed "map" indicating the best fixed transponder to be used in each of the areas surrounding the radar.

Locator 40 determines aircraft positions in three dimensions. Therefore, the locator receives and stores its own aircraft's altitude—by automatic input from its altimeter or transponder, by receiving and decoding its own mode C replies, or by the pilot's manual input—and it also determines the altitudes of other aircraft by decoding their mode C replies. The explanation herein of the locator's operation presents the equations used to solve for the three-dimensional position of the locator's aircraft 54, and the three-dimensional position of any proximate transponder-equipped aircraft 70. In a three-dimensional view, the altitude of each aircraft determines a horizontal plane, and the bearing of each aircraft determines a vertical half-plane, rather than a ray. The absolute value of the difference $U-V$ determines a hyperboloid, rather than a hyperbola; and the sum $X+Y$ determines an ellipsoid, rather than an ellipse. Figures illustrating the distances and angles pertinent to the three-dimensional configuration, and derivations of the equations programmed into the locator, are not included herein. Including such figures and derivations would be of slight value, and could constitute an unnecessary complication to the understanding of the invention by one skilled in the art.

Figure 11:
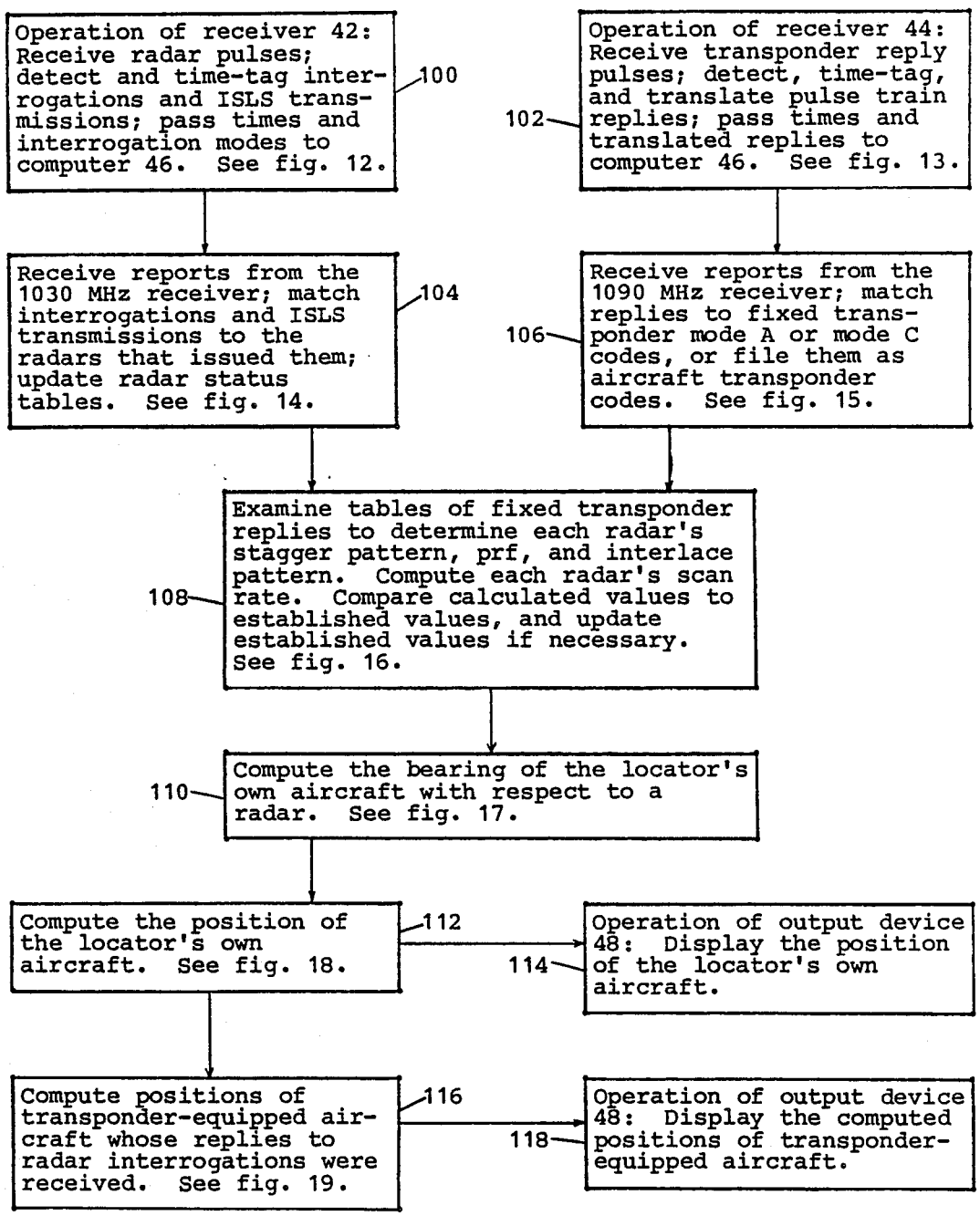
FIG. 11 illustrates the order of logical precedence of the locator's functions.

The locator performs its processing in "real time," wherefore its components, receivers 42 and 44, computer 46, and output device 48, operate simultaneously. Within the computer's program, the various major routines also operate simultaneously, or at least share the computer's hardware resources so as to effectively operate simultaneously. Computer systems with supervisory software that permits "multiprogramming" and "multiprocessing" are commercially available from several manufacturers. The locator can be built with any such computer, as long as its speed, storage capacity, environmental suitability, etc. are satisfactory. The choice of computer 46 would necessarily affect the nature of the executive routine needed to coordinate operation of the program's data processing routines, i.e. the routines that determine the positions of the locator's own aircraft, and of the transponder-equipped aircraft in its vicinity. The executive determines such matters as which hardware resources are used to execute which routines, and the order and frequency of execution. While the executive could be written in various ways, depending on the style of its programmer, its operation must in any case preserve a logical order of precedence essential to the locator's operation, in that the output of certain of the data processing routines constitutes input to others. FIG. 11 illustrates the order of precedence.

Note that FIGS. 11 through 19 and the related disclosure are included herein so as to further explain the invention. They are not intended to limit the scope of the invention.

Receivers 42 and 44, whose tasks are summarized in steps 100 and 102 respectively, operate continuously, since interrogations, ISLS transmissions, and transponder replies could be received at any time, particularly in an environment where there is more than one radar, and where there are many transponder-equipped aircraft. The computer program routines for loading and sorting input from 1030 MHz receiver 42 and 1090 MHz receiver 44, summarized in steps 104 and 106 respectively, must operate fast enough to keep up with the flow of input from the two receivers. If computer 46 is one that can accept and process inputs occurring at random, then it could be programmed so that operation of the loading and sorting routines would be triggered by signals sent from the receivers when they are ready to pass data to the computer.

Routine 108, for maintaining the program's table of basic information—i.e. locations of radars and fixed transponders, radar rotation rates, pulse repetition frequencies, stagger patterns, and mode interlace patterns—necessarily follows routines 104 and 106, for loading and sorting input, since the loading and sorting routines organize the data for the table maintenance routine.

Because the table maintenance routine, 108, determines fixed transponder center-azimuth times, it must be executed before routine 110, the routine for determining the bearing of the locator's own aircraft.

The bearing of the locator's own aircraft is one of the geometric parameters needed in the calculation of the aircraft's position; therefore, routine 110 must precede routine 112, which completes the computation of the position of the locator's aircraft.

After the position of the locator's aircraft has been computed, it can be sent to output device 48, which displays it, as shown in step 114.

Determining the position of the locator's own aircraft is also prerequisite to determining the positions of other aircraft in its vicinity; consequently step 116, which determines the other aircraft positions, must follow step 112.

After computing the position of another aircraft, the locator displays it through output device 48, as illustrated in step 118.

Figure 12:
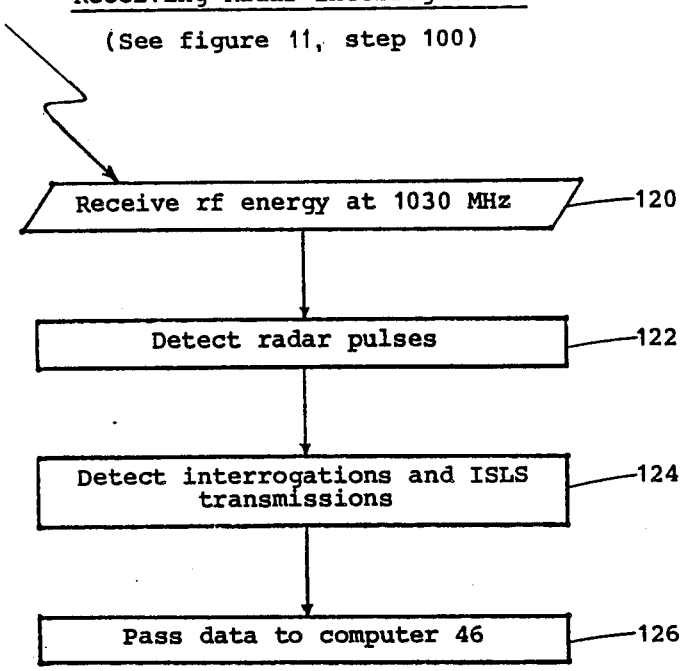
FIG. 12 illustrates the major functions of the locator's 1030 MHz receiver.

FIG. 12 summarizes the operation of the 1030 MHz receiver, 42. When locator 40 is on, the receiver operates continuously, receiving rf energy transmitted from secondary radars at the frequency 1030 MHz, as shown in step 120.

In step 122, receiver 42 determines whether it has received a radar pulse. It does so by checking the received rf energy to detect a pulse's leading edge and trailing edge, and by verifying that all other pulse shape characteristics specified by U.S. and ICAO standards, such as leading edge rise time, pulse amplitude, pulse duration (width), and trailing edge fall time, are satisfied. If the pulse meets specifications, it is time-tagged and temporarily stored. Received energy which does not meet the specification for a valid radar pulse is discarded as noise.

As shown in step 124, receiver 42 next checks the valid pulses it temporarily stored, to find a pair properly spaced to be an ISLS transmission. If it finds such a pair of pulses, P1 and P2, it records the time it received the leading edge of P1. The receiver next compares the amplitudes of P1 and P2, to determine whether it received only an ISLS transmission, or part of an interrogation. (If the amplitude of P1 greatly exceeds that of P2, then the locator's aircraft, 54, must be in the coverage of interrogation beam 16; and P1 must therefore be the first pulse of an interrogation's P1, P3 pair. If P1's amplitude is not much greater than that of P2, then aircraft 54 is necessarily outside the coverage of beam 16, and the P1, P2 pair must be an ISLS transmission.) If receiver 42 determines that it has received the P1 pulse of an interrogation, it next checks its temporary storage to find a pulse properly spaced to be the matching P3. In the event that it finds a pulse whose leading edge follows that of the P1 pulse by 8 microseconds or 21 microseconds, it records the pair as constituting either a mode A or mode C interrogation, as appropriate. In the event that receiver 42 cannot find a pulse qualifying as P3, it records the P1, P2 pair as an ISLS transmission.

As indicated in step 126, receiver 42 reports its findings to computer 46. In particular, if the receiver detected an interrogation, it reports its mode, either mode A or mode C, and the time it received the leading edge of the P1 pulse. If receiver 42 detected only an ISLS transmission, then it simply reports the time it received the leading edge of P1, since in this case receiver 42 has no way to determine the mode of the interrogation issued simultaneously with the ISLS transmission.

Figure 13:
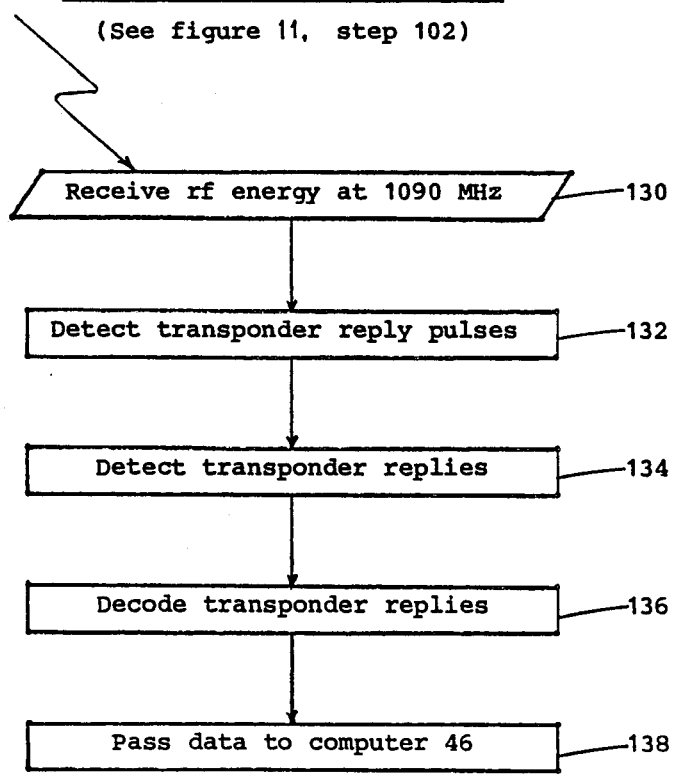
FIG. 13 illustrates the major functions of the locator's 1090 MHz receiver.

FIG. 13 summarizes the operation of the 1090 MHz receiver, 44. When locator 40 is on, the receiver operates continuously, receiving rf energy transmitted by transponders at the frequency 1090 MHz, as shown in step 130.

In step 132, receiver 44 determines whether it has received a transponder reply pulse. It does so by checking the received rf energy to detect a pulse's leading edge and trailing edge, and by verifying that all other pulse shape characteristics specified by U.S. and ICAO standards, such as leading edge rise time, pulse amplitude, pulse duration (width), and trailing edge fall time, are satisfied. If the pulse meets specifications, receiver 44 notes the arrival time of its leading edge, and temporarily stores the pulse. In general, received energy that does not meet the specification for a valid transponder reply pulse is discarded as noise. However, it is also desirable that receiver 44 be designed to recognize the possibility that a wide pulse may actually consist of overlapped normal pulses from two different transponders, and that the receiver save such wide pulses for further processing.

As shown in step 134, receiver 44 next checks the valid pulses it temporarily stored, to find a pair properly spaced to be the framing pulses, F1 and F2, of a transponder's reply. If a pair of pulses does qualify as F1 and F2, then the receiver checks the shapes and positions of all the pulses found between them; and if all are valid, it recognizes the train of pulses as a transponder reply. It is desirable that receiver 44 be designed so that when it detects a misspaced or wide pulse, it further checks the pulses received before F1 and after F2, to determine if another set of framing pulses is present; and if it does indeed detect another pair of framing pulses, that it checks to determine if the misspaced pulse belongs to the other pair, or if the wide pulse should be separated into two normal pulses, one belonging to each pair. If receiver 44 does determine that a misspaced or wide pulse resulted from the overlap or interleaving of two transponder replies, it separates the pulse trains into individual replies. Otherwise, receiver 44 discards any misspaced or wide pulses.

It is also desirable that receiver 44 be designed to check pulses received before F1 and after F2, to determine if the apparent "bracket" (framing pulse pair) is likely to have resulted from an overlap of two transponder replies; in which case the bracket and the pulses within it probably represent a "phantom" reply, which should be discarded.

Figure 1:
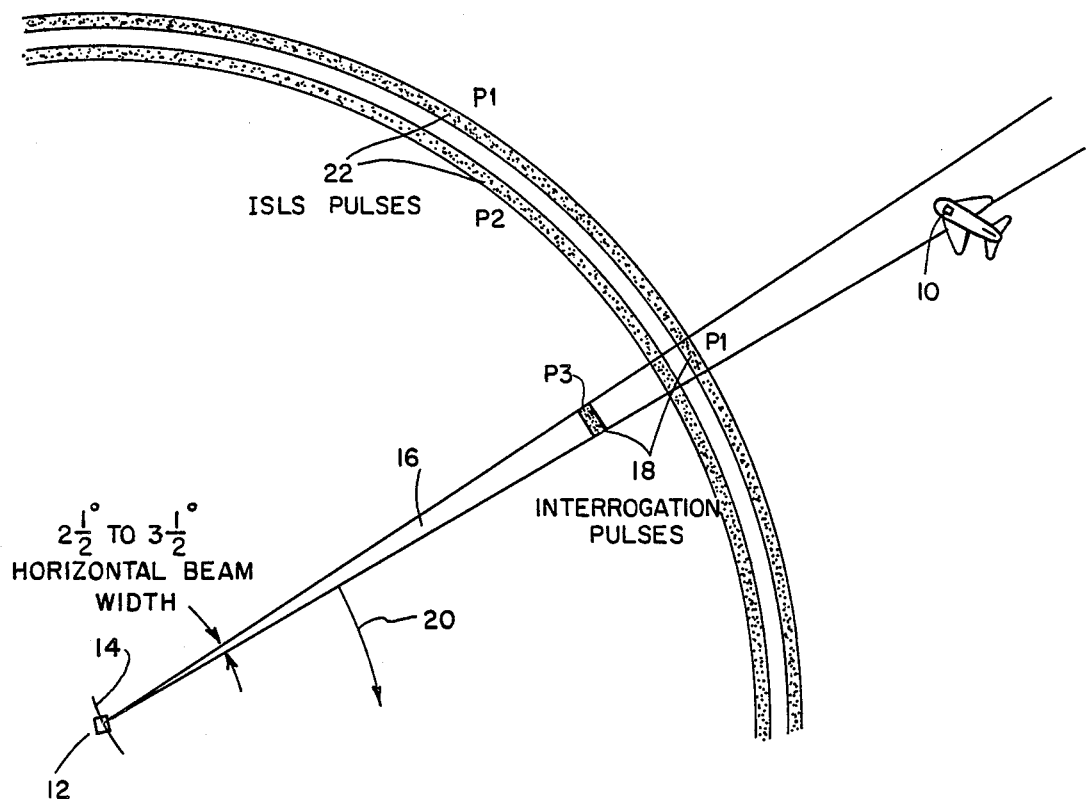
FIG. 1 illustrates a secondary surveillance radar transmitting an interrogation pulse beam and an omnidirectional ISLS pulse pair for reception by a nearby aircraft.
Figure 2:
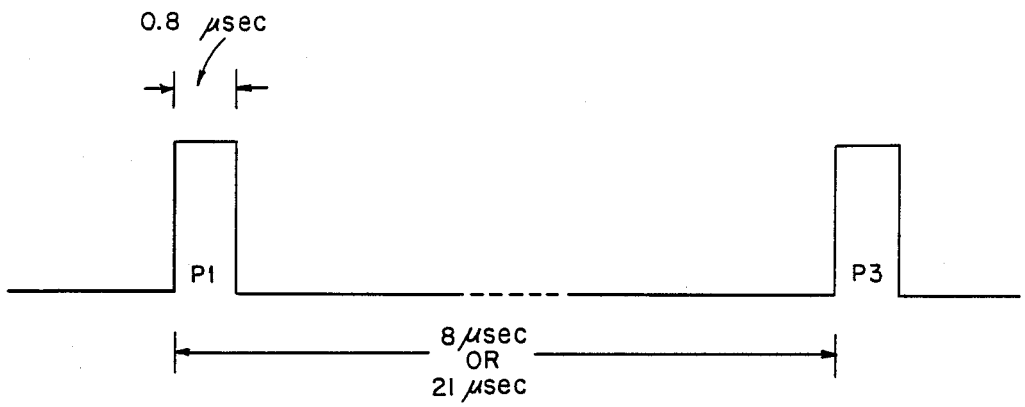
FIG. 2 shows an interrogation pulse pair P1 and P3.
Figure 3:
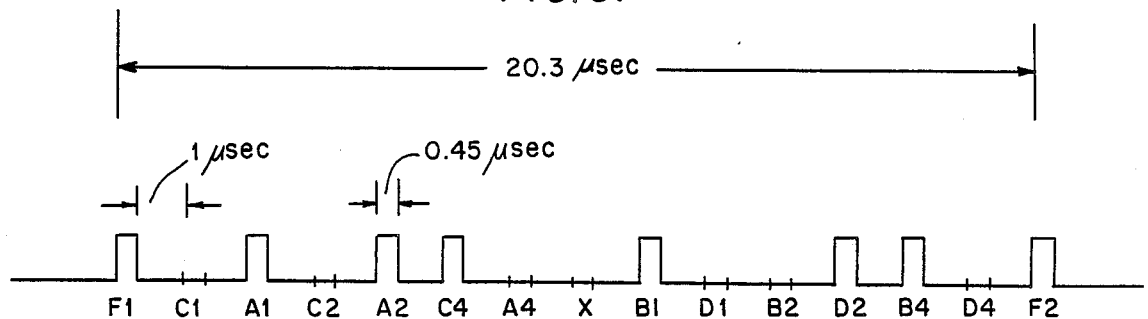
FIG. 3 shows a transponder reply pulse train.
Figure 4:
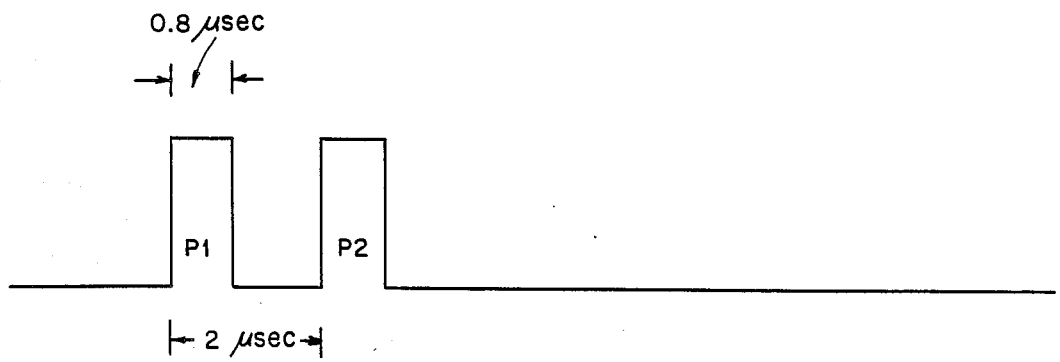
FIG. 4 shows an ISLS signal pulse pair P1 and P2.

Having detected a transponder reply, receiver 44 next decodes it, as shown in step 136, and as illustrated in FIG. 3.

Step 138 shows that the receiver then passes the decoded reply and the arrival time of its F1 pulse, both in digital form, to computer 46.

Figure 14:
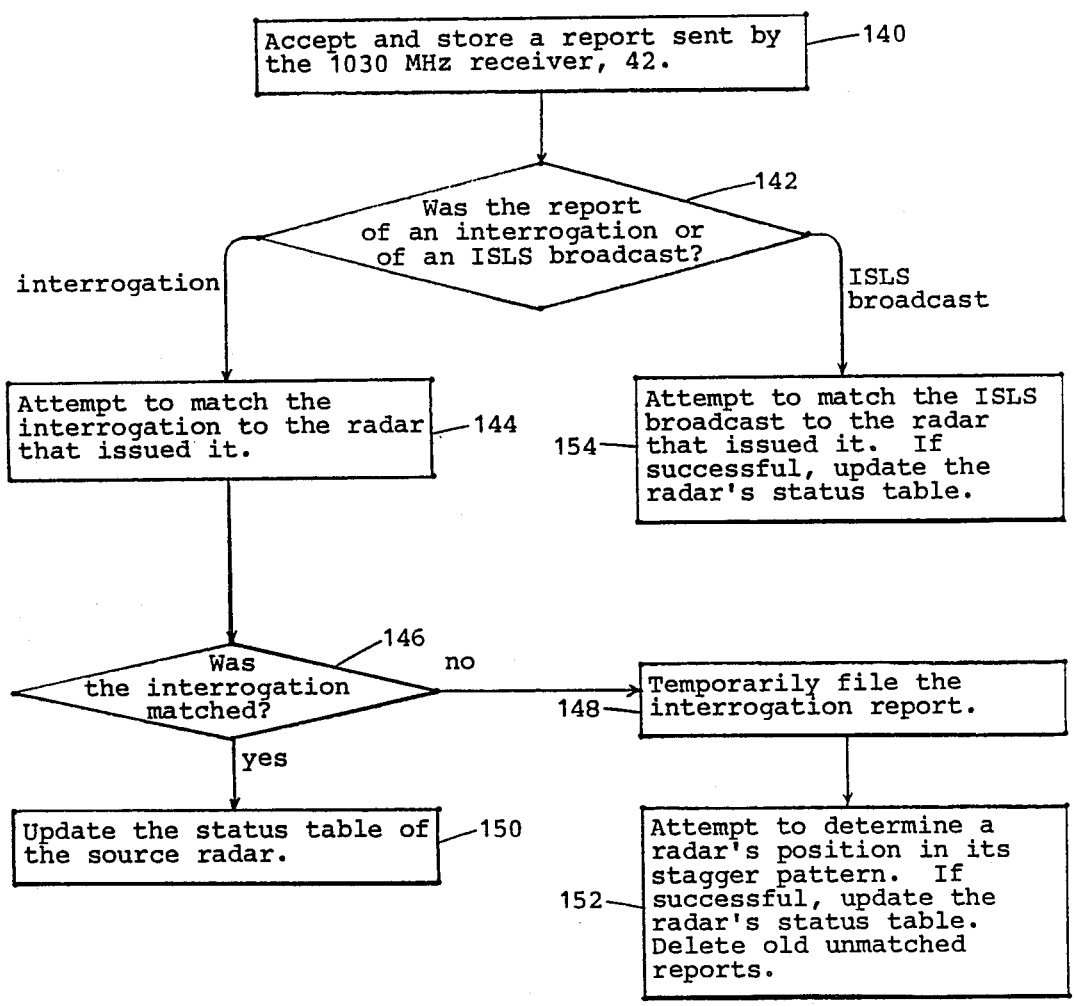
FIG. 14 summarizes the computer program routine for processing inputs provided by the 1030 MHz receiver.

FIG. 14 summaries the computer program routine by which computer 46 loads and sorts the data passed to it by receiver 42. Step 140 shows that the computer first accepts and stores a report coming from the receiver. As shown in step 142, it next inspects the report to determine which kind of transmission was received: interrogation or ISLS broadcast.

Step 144 shows that if a report concerns an interrogation, computer 46 attempts to match the interrogation to the radar that issued it. For each radar whose stagger pattern and mode interlace pattern are known, and whose positions in its patterns were recently determined, computer 46 extrapolates the patterns up to (or just past) the reported arrival time, the time when the leading edge of the P1 pulse arrived at receiver 42. If the interrogation's arrival time matches some radar's extrapolated stagger pattern, and its mode matches the same radar's extrapolated interlace pattern, then that radar is determined to be the source of the interrogation. For the sake of efficiency, the routine should be written to first test an interrogation's arrival time and mode against the extrapolated patterns of any radar whose interrogations were heard within the immediate past, i.e. within a time period comparable to a beam dwell; to next test against the extrapolated patterns of any radar heard approximately one scan period prior to the arrival time; and finally, to test against the patterns of all other radars heard within the previous few minutes. If in step 144 the computer cannot match both the arrival time and mode to a radar's extrapolated patterns, then, as is illustrated in steps 146 and 148, the report is temporarily filed with other such reports of interrogations whose sources have not yet been determined.

Step 150 indicates that when an interrogation is matched to a radar, its arrival time, mode, and stagger pattern position are filed as an entry in a table dedicated to that radar's transmissions. The computer chronologically orders the table, and records as an update of the radar's status, the entry having the most recent arrival time.

As is shown in step 152, an interrogation that was not matched to a radar, and has therefore been stored, may be held for about the time of a beam dwell—up to about 1/10 second—before being discarded. Whenever it adds an interrogation report to the file, computer 46 checks to determine if any sequence of stored arrival times matches a radar's stagger pattern. (The pattern may have been prestored, or it may have been determined by the environmental data base maintenance routine, whose description follows herein.) If a sequence of arrival times does match some radar's stagger pattern, then the computer files each of those arrival times, along with its matching stagger pattern position and its interrogation's reported mode, as an entry in a table dedicated to that radar's transmissions. The table is chronologically ordered by the computer, and the entry with the most recent arrival time is recorded as providing the radar's current status.

Step 154 shows that if a report concerns an ISLS broadcast, computer 46 also attempts to match the transmission to its source. For each radar whose stagger pattern is known, and whose position in its pattern was recently determined, computer 46 extrapolates the pattern times up to or just past the broadcast's reported arrival time. If the arrival time matches some radar's extrapolated stagger pattern, then that radar is determined to be the source of the broadcast. If the arrival time does not match any of the extrapolated stagger pattern times, the report is discarded. Note that although computer 46 could be programmed to check unmatched ISLS broadcasts, much as it checks unmatched interrogations in step 152, there would be little benefit from doing so: A locator-equipped aircraft flying into a radar's coverage area is likely to receive the radar's interrogations long before receiving its ISLS broadcasts, because of the greater strength of the interrogation beam, 16. Therefore, interrogations should normally serve far better than ISLS broadcasts, for the locator's initial determination of a radar's position in its stagger pattern.

If the arrival time of the ISLS broadcast does match some radar's extrapolated stagger pattern, then the time and stagger pattern position are filed as an entry in the table dedicated to that radar's transmissions. If the radar's mode interlace pattern is known, and its position therein was recently determined, the pattern is extrapolated to the reported arrival time, and the mode is filed in the new entry. Recall that the mode is that of the interrogation issued simultaneously with the reported ISLS broadcast. The computer chronologically orders the table, and records the entry having the most recent arrival time as an update of the radar's status.

Figure 15:
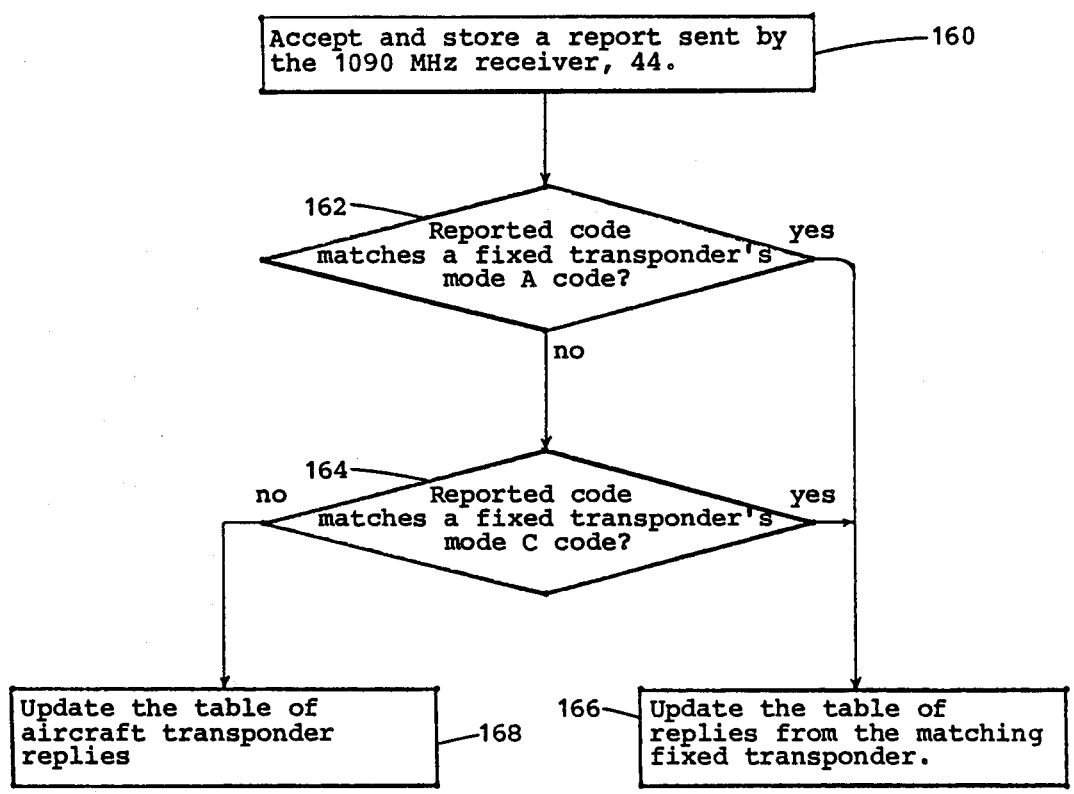
FIG. 15 summarizes the computer program routine for processing inputs provided by the 1090 MHz receiver.

FIG. 15 summarizes the computer program routine by which computer 46 loads and sorts data passed to it by receiver 44. Step 160 shows that the computer first accepts and stores a report coming from the receiver. As shown in step 162, it next determines if the reported code matches some fixed transponder's mode A code, i.e. its identity code. The computer does this most efficiently by successively comparing the reported code, until it finds a match, against:

(1) the last fixed-transponder mode A code that matched a reported transponder reply;

(2) all other fixed-transponder mode A codes recently reported by receiver 44;

(3) all other fixed-transponder mode A codes in the geographic area of aircraft 54.

If computer 46 does find a match, it records the mode A code as the most recent fixed-transponder identity code to have matched a report.

Step 164 shows that if the computer cannot match the reported code to any fixed transponder's mode A code, it next attempts to find a matching fixed-transponder mode C (altitude) code. For the sake of efficiency, its check again follows the order likely to achieve a match with the least fruitless processing. That is, until it finds a match or exhausts its list of fixed transponders, computer 46 successively compares the reported code against:

(1) the mode C code of the last fixed transponder whose mode A code matched a report;

(2) the mode C codes of all other fixed transponders whose mode A codes were recently reported by receiver 44;

(3) the mode C codes of all other fixed transponders in the geographic area of aircraft 54.

Step 166 shows that if computer 46 does match the reported code to some fixed transponder's mode A or mode C code, then it stores the reported arrival time and determined mode (A or C) as a new entry in a table dedicated to that particular fixed transponder. (The table is "labeled" with the transponder's mode A and mode C codes.) For convenience in later processing, the computer chronologically orders the table.

If computer 46 cannot match the reported code to any fixed transponder's mode A or mode C code, it then concludes that the reported reply must have emanated from an aircraft transponder. Step 168 shows that in this case, the computer files the reported arrival time and code as a new entry in a table of received replies from aircraft transponders. For convenience in later processing, the computer chronologically orders the table.

FIG. 16 shows the routine by which computer 46 maintains the locator's environmental data base. It is essential that the locations of radars and fixed transponders be prestored. Though it is desirable that each radar's scan rate, pulse repetition frequency (prf), stagger pattern, and mode interlace pattern also be prestored, the environmental data base maintenance routine computes those parameters. By periodically computing them, locator 40 reverifies the validity of its environmental data, even if all radar parameters were initially prestored. Although the locator's computer can be programmed various ways, the data base maintenance routine need only be executed once every few seconds, since its input is contained in the fixed-transponder reply tables, and each such table is updated only once during each scan (antenna rotation) of its associated radar.

In FIG. 16, steps 170, 172, 174, and 176 show that the routine operates as a "loop," in which each passage through the loop processes the reply table of another fixed transponder, until all such reply tables have been processed.

Step 178 shows that for the table under consideration, computer 46 first groups the table's entries, records of fixed transponder replies, according to the beam passage in which they occurred. Aggregation by beam passage is already implicictly accomplished by virtue of the chronological ordering in step 166. Determining the boundaries of each beam passage is simplified by the fact that beam dwell is roughly 1/10 second at most, while the time between successive passages is roughly one scan period, i.e. at least 4 seconds.

Having grouped all replies from the same beam passage, the computer next determines, in step 180, the stagger pattern, mode interlace pattern, and prf of the fixed transponder's radar. The stagger pattern is determined by the sequence of time intervals between successive arrival times stored in the reply table. Likewise, the computer ascertains the mode interlace pattern from the sequence of reply modes stored in the table's entries. After determining the stagger pattern, the computer can calculate the average time interval between successive replies, the reciprocal of which gives the pulse repetition frequency (prf).

In step 182, the computer calculates and stores the transponder's "center-azimuth time," i.e. the time when the center of the beam passed over the fixed transponder. It does so by averaging the (already grouped) arrival times of the replies elicited during that beam passage. (The averaging need not be simple. For example, the routine might fit the sample of arrival times to an assumed probability density function describing the probability of transponder reply as a function of the transponder's angular position with respect to the beam center; and the time when the beam center passed over the transponder could then be determined from that fit.)

Step 184 shows that the computer next determines the scan period of the fixed transponder's radar. Since the radar interrogates the transponder once per scan, and rotates at a uniform rate, the most recent scan period is simply the difference between the two most recent center-azimuth times. Note that the next-to-the-most-recent center-azimuth time may have been computed and stored during a previous execution of the data base maintenance routine, depending on the frequency of the routine's execution and on the radar's rotation rate. The routine calculates the radar's scan rate, in degrees per second, by dividing 360° by the computed scan period; and it stores both the scan period and scan rate.

In computing the parameters that characterize the radar's operation, the program should accommodate the real-world possibilities that the fixed transponder might not reply to every interrogation issued while the beam is passing over it, and the locator right not receive all of the transponder's replies. Therefore, if values are already established for stagger pattern, interlace pattern, and scan period, whether by prestorage or by computation, the routine should immediately check newly computed values against established values, to determine if any differences could be due to the absence of a reply. For example, if the computed scan period, the difference between the last two computed center-azimuth times, is an integer multiple of the established scan period, it is safe to assume that the locator simply missed the fixed transponder's replies during one or more beam passages. Likewise, if an interval of the computed stagger pattern is the sum of two or three consecutive intervals of the established pattern, it is safe to assume that either the locator simply missed at least one or two of the transponder's replies, or that the transponder failed to reply to some of the radar's interrogations during the beam's passage over it. In the event that some radar parameter does not yet have an established value, the first computed value might be stored, but not used until confirmed by subsequent computations on data received during the next few scans. i.e., the locator might need to go through a "warm up" period of a few scans before using the data from a particular radar to compute aircraft positions. These considerations should be taken into account in the programming of steps 180 and 184, and in the programming of step 186, which compares the values of the parameters computed in steps 180 and 184 to the corresponding established values.

If all computed values agree with the corresponding established values, the program returns to step 172, either to begin processing of the next reply table, or to exit the routine, if all reply tables have been processed.

If a computed value of a radar parameter does not agree with its established value, then some form of error processing must take place, as shown in step 188. The programming for this step could take various forms. For example, over a period of several scans, the computer could store all calculated values of the parameter. If those values were all consistent with each other, and disagreed with the established value, then the established value would be replaced with the calculated value. Otherwise, the established value would be retained.

After completing whatever error routine processing is required in the current execution of the loop, the program returns to step 172, where it determines whether to begin another pass through the loop, or to exit.

FIG. 17 shows the computer program routine by which locator 40 determines its azimuth (bearing) with respect to a radar in whose coverage area its aircraft 54 is flying. Since the radar normally "sees" the aircraft approximately once per scan, the routine's frequency of execution need only be on the order of a radar's scan frequency, i.e. once every few seconds. (Only if aircraft 54 is being interrogated by several radars might greater execution frequency be of some benefit.)

Steps 200, 202, and 204 show that the routine operates as a loop, with each pass through the loop processing data from the table of interrogation reports dedicated to some particular radar (see step 150). As shown in step 206, such a table of interrogation reports must also satisfy certain criteria in order to be processsed. In particular, the radar that issued the interrogations must have a known scan rate; and it must have a fixed transponder whose center-azimuth time was recently computed (see step 182). Computer 46 retrieves the scan rate and the fixed transponder's center-azimuth time for use in a later step in this routine.

Upon finding a table of interrogation reports satisfying the above-mentioned criteria, the computer proceeds to step 208, wherein it aggregates the reports of the beam's most recent passage over the locator's aircraft 54. The aggregation was implicitly accomplished by the chronological ordering in step 150 or step 152; and it is normally easy for the computer to determine the boundaries of the beam passage, since the passage takes no more than about 1/10 second, and occurs approximately once per scan period.

After all reports from the most recent beam passage over the locator's aircraft have been aggregated, computer 46 determines when the beam's center passed over the aircraft. That is, as indicated in step 210, the computer determines the locator's center-azimuth time. It does so by an averaging technique, such as the technique used in step 182 to determine when the interrogation beam's center passed over a fixed transponder.

Step 212 shows that after determining the locator's center-azimuth time, the computer is ready to determine the bearing of the locator's aircraft with respect to the radar. The computer first calculates the difference between the locator's center-azimuth time and the fixed transponder's center-azimuth time. Multiplying that time difference (in seconds) by the radar's rotation rate (in, for example, degrees per second) yields as product the beam's angular change from its passage over the transponder until its passage over the locator. Adding that angular change to the fixed transponder's bearing with respect to the radar then gives as the sum the bearing of the locator-equipped aircraft at its center-azimuth time. (According to the style of the computer program, the fixed transponder's bearing with respect to the radar may have been input along with the locations of the radar and fixed transponder; or the bearing may have been calculated directly from those locations during an initial "warm up" routine.)

Step 214 shows that computer 46 next checks the bearing of its aircraft, calculated in step 212, to verify that it is reasonable. If the just-calculated bearing agrees with previous determinations of the locator's bearing (with respect to the same radar) then as shown in step 216, the computer stores the newly calculated center-azimuth time and bearing. The computer also uses the last few calculated (center-azimuth time, bearing) pairs to update its estimate of $\omega$, the current rate of change of the bearing.

The estimate for $\omega$ might simply be the quotient whose numerator is the difference of the last two calculated bearings, and whose denominator is the difference of the corresponding center-azimuth times; or the computer might combine the last few such calculated quotients in some appropriately weighted average, to give a "smoothed" estimate for $\omega$.

In the event that the just-computed bearing does not agree with previously determined bearings, the computer executes an error-handling routine, as indicated in step 218. The routine could be written in various ways: for example, it might store the just-computed center-azimuth time and bearing, until future computations of the bearing, based on new data, either confirm or refute the present result. Confirmation of the present result would cause computer 46 to re-initiate its "track" of the bearing of aircraft 54, using the newly calculated bearings; refutation of the present result would cause computer 46 to discard it.

In deciding whether a calculated bearing is reasonable, computer 46 shoud recognize that large bearing changes, even changes of 180°, can occur within one radar scan period when aircraft 54 is close to the radar. The programming of the reasonableness check, step 214, should take advantage of the locator's track of its own aircraft's position—if a track has already been established—to detect such large changes in bearing.

FIG. 18 shows the routine by which computer 46 determines its own aircraft's position. After entering the routine at step 230, the computer proceeds to step 232, wherein it examines the tables of replies from fixed transponders interrogated by those radars with respect to which the locator has recently determined its bearing. (The reply tables were loaded in step 166.) In examining each table, the computer attempts to find a sequence of recent replies, all received within a time comparable to a beam dwell. If unable to find any such sequence, the computer abandons the current execution of the routine, as indicated in steps 234 and 236. If it does find a sequence of fixed transponder replies, then as indicated in step 234, the computer proceeds to step 238, wherein it searches the table of ISLS broadcasts emanating from the radar that elicited those replies. (The table of ISLS broadcasts was loaded in step 154.) Computer 46 searches the table of ISLS broadcasts in order to find the sequence of broadcasts that matches the chosen sequence of fixed transponder replies. In particular, the ISLS broadcasts must:

(1) follow the same stagger pattern, if any, as the sequence of fixed transponder replies (which property should already be ensured by the processing in step 154);

(2) be the most recent such sequence for which each ISLS transmission arrived at the locator prior to the arrival of the corresponding fixed transponder reply; and (3) have arrival times at the locator which do not precede the arrival times of the corresponding fixed transponder replies by more than some established tolerance. The tolerance, utilized as a reasonableness check, is on the order of a few hundred microseconds—in any case less than an inter-interrogation period.

If a matching sequence of ISLS broadcasts cannot be found, then as is shown in step 240, the computer branches to step 242, wherein the selected sequence of fixed transponder replies is labeled as being unusable, and from which the computer returns to step 232, to try to find another sequence of replies.

If on the other hand a matching sequence of ISLS broadcasts is found, computer 46 proceeds with calculation of its aircraft's position. Step 244 shows that the computer calculates $t_2-t_1$, the time difference by which receipt of each ISLS broadcast preceded receipt of the corresponding fixed transponder reply; and it then subtracts off the turnaround time, $t_t$, to yield the quantity $t_2-t_1-t_t$. (In this calculation, computer 46 must recognize that the transponder's replies to mode C interrogations can be expected to have arrived at the locator 13 microseconds farther behind their matching ISLS broadcasts than the transponder's replies to mode A interrogations. This difference is due to the fact that the transponder issues its replies to interrogations a fixed time after receiving the leading edge of the P3 pulse; and measuring with respect to the tire the P1 pulse is issued, the P3 pulse is issued 13 microseconds later for mode C interrogations than for mode A interrogations. According to the way the program is written, $t_t$ may be viewed as being 13 microseconds longer for mode C replies than for mode A replies; or the extra 13 microseconds may be eliminated in the computation of $t_2-t_1$). Although in principle, only one transponder reply and matching ISLS broadcast are needed to establish time difference $t_2-t_1$, the typical presence of several replies and matching ISLS broadcasts makes it possible for the computer to obtain a more accurate estimate of that difference, for example by averaging the individual arrival time differences. Computer 46 next calculates the product $c(t_2-t_1-t_t)$ (c again denotes the speed of electromagnetic propagation) and then subtracts therefrom the prestored or precomputed distance d between the radar and the fixed transponder. That is, the computer calculates $V-U = c(t_2-t_1-t_t)-d$. It also computes the quantity $a=\frac{1}{2}|V-U|$, and verifies that d/2 is greater than a. If d/2 is not greater than a, there is some problem with the data. In that case the computer returns to step 242 (the return is not specifically shown on FIG. 18) and prepares to reinitiate its attempt to determine its own position.

If d/2 is greater than a, computer 46 continues with its determination of its own aircraft's position. In step 246 it retrieves from storage the heights above sea level of the radar and fixed transponder, $h_r$ and $h_t$ respectively. It next calculates the quantity $b^2 = (d^2/4)-a^2$, and calculates trigonometric functions of an angle $\alpha$. If $h_t$ is greater than $h_r$, $\alpha$ is the acute angle at which the line through the radar and the fixed transponder intersects the plane of the earth's surface. If $h_r$ is greater than $h_t$, $\alpha$ is the negative of that angle. If $h_r=h_t$, $\alpha$ is 0. The formulas for the trigonometric functions of $\alpha$ are:

$$\sin\alpha = \frac{h_t - h_r}{d},$$

$$\cos\alpha = \frac{\sqrt{d^2 - (h_t - h_r)^2}}{d},$$

$$\tan\alpha = \frac{\sin\alpha}{\cos\alpha}.$$

The computer then retrieves from storage its own aircraft's altitude, $z_0$. As previously noted, the altitude $z_0$ could be input to the locator by some form of direct connection from the aircraft's mode C encoder, by a pilot-operated input device, or by the locator's sorting from its table of aircraft transponder replies, those that emanated from its own transponder. The present invention does not depend on the manner in which the altitude datum $z_0$ is entered.

In step 248, computer 46 retrieves from storage its most recent determination of its bearing with respect to the radar whose fixed transponder replies it is using to determine its position. In particular, the computer retrieves its most recent (center-azimuth time, bearing) pair $(t,\theta)$ and the corresponding azimuth change rate $\omega$. Using these data, the computer calculates its own aircraft's bearing at time $t_1$ to be $\theta+\omega(t_1-t)$. Subtracting the fixed transponder's bearing from the aircraft's bearing at $t_1$ then yields the bearing difference $\theta$. (In calculating $\theta$, computer 46 performs the subtraction modulo 360°—i.e. the computer expresses the result as a non-negative angle less than 360°.) Computer 46 next determines three intermediate quantities, the formulas for two of which utilize the just-computed value of $\theta$:

$$A = (\tfrac{1}{2}\tan\alpha(2z_0 - h_r - h_t) - (d/2)\cos\alpha)\tan\theta;$$

$$B = (\cos\alpha + \sin\alpha\tan\alpha)\tan\theta;$$

$$C = \frac{2z_0 - h_r - h_t}{2\cos\alpha}.$$

In step 250, computer 46 checks to determine if the absolute difference $|V-U|$, calculated in step 244, represents a "degenerate" hyperboloid. If $a=0$ (i.e. if $V=U$) then the hyperboloid is indeed degenerate, and the determination of the aircraft's position continues in step 252, with a simple computation in an intermediate coordinate system based on the locations of the radar and fixed transponder. The position of aircraft 54, expressed in intermediate coordinates as $(u_0,v_0,w_0)$, is determined by the formulas $u_0=0$, $v_0=A$, $w_0=C$. After storing these values for $u_0$, $v_0$, and $w_0$, the computer branches directly to step 262.

If step 250 shows that a is nonzero, then computer 46 continues the determination of its aircraft's position by calculating, in step 254, the quantities D, E, and F, according to the formulas:

$$D = (b^2/a^2) - \tan^2\alpha - B^2;$$

$$E = 2AB + 2C\tan\alpha;$$

$$F = -(A^2 + b^2 + C^2).$$

In step 256, the computer checks to determine if continuing the computation with its current data will yield nonreal solutions, which would occur when $E^2$ is less than 4DF. If that is the case, the program reverts to step 242, where it marks the chosen sequence of transponder replies as unusable, and then proceeds to step 232, to reinitiate its attempt to determine its position.

If $E^2$ is not strictly less than 4DF, computer 46 next checks, in step 258, to determine if there is a unique solution for the position of aircraft 54. This occurs in the event that $E^2 = 4DF$; in which case the program branches to step 260, where the computer calculates its aircraft's position, expressed in intermediate coordinates $(u_0, v_0, w_0)$. The computation uses the following formulas, first calculating $u_0$, then $w_0$, then $v_0$:

$$u_0 = \frac{-E}{2D};$$

$$w_0 = C - u_0\tan\alpha;$$

$$v_0 = (w_0\sin\alpha - (u_0 + (d/2))\cos\alpha)\tan\theta.$$

After computing $u_0$, $v_0$, and $w_0$, the program continues at step 262, where it converts the position expressed in intermediate coordinates to a position expressed in "final" coordinates based partially on the locations of the radar and fixed transponder, and using the earth's surface at sea level as one of its coordinate planes, the (x,y)-plane. (Converting the aircraft's position to any other well-defined coordinate system is a routine, though possibly complex, task which computer 46 could be programmed to perform as might be required.) The equations for converting the aircraft's position from its value $(u_0, v_0, w_0)$ in the intermediate (u,v,w)-system to its value $(x_0, y_0, z_0)$ in the "final" (x,y,z)-system, are $x_0 = u_0\cos\alpha - w_0\sin\alpha$, and $y_0 = v_0$. The value of $z_0$ was input, and need not be calculated. Computer 46 stores $(x_0, y_0, z_0)$ as its aircraft's position at time $t_1$, and then proceeds to step 272.

If in step 258 computer 46 did not find $E^2 = 4DF$, then it proceeds to step 264, where it computes in intermediate coordinates the two possible solutions for its aircraft's position. The computer calculates the two possible values of $u_0$, $u_0^{(+)}$ and $u_0^{(-)}$, by the formulas:

$$u_0^{(+)} = \frac{-E + \sqrt{E^2 - 4DF}}{2D},$$

$$u_0^{(-)} = \frac{-E - \sqrt{E^2 - 4DF}}{2D}.$$

It then calculates corresponding values of $v_0$ and $w_0$, using the formulas:

$$w_0^{(+)} = C - u_0^{(+)}\tan\alpha;$$

$$w_0^{(-)} = C - u_0^{(-)}\tan\alpha;$$

$$v_0^{(+)} = (w_0^{(+)}\sin\alpha - (u_0^{(+)} + (d/2))\cos\alpha)\tan\theta;$$

$$v_0^{(-)} = (w_0^{(-)}\sin\alpha - (u_0^{(-)} + (d/2))\cos\alpha)\tan\theta.$$

The computer then converts the two possible positions to "final" coordinates, $(x_0^{(+)}, y_0^{(+)}, z_0)$ and $(x_0^{(-)}, y_0^{(-)}, z_0)$, using the formulas:

$$x_0^{(+)} = u_0^{(+)}\cos\alpha - w_0^{(+)}\sin\alpha,$$

$$y_0^{(+)} = v_0^{(+)},$$

$$x_0^{(-)} = u_0^{(-)}\cos\alpha - w_0^{(-)}\sin\alpha,$$

$$y_0^{(-)} = v_0^{(-)}.$$

Having calculated the two possible positions of aircraft 54, $(x_0^{(+)}, y_0^{(+)}, z_0)$ and $(x_0^{(-)}, y_0^{(-)}, z_0)$, the locator continues at step 266, where it tests to determine which of them is the actual position. It does so by twice operating the central portion of the procedure described herein for determining the location of another transponder—usually that of another aircraft, but in this case, the fixed transponder whose reply sequence was selected in step 232. The input for one of the procedure calls is one of the locator's own hypothetical positions, $(x_0^{(+)}, y_0^{(+)}, z_0)$ at time $t_1$, and the fixed transponder's altitude $h_t$. (Within the routine for calculating another transponder's position, the altitude $h_t$ is used, more generally, as the "other" transponder's altitude, $z_1$.) The input for the other of the two procedure calls is the locator's other hypothetical position, $(x_0^{(-)}, y_0^{(-)}, z_0)$ at time $t_1$, and the fixed transponder's altitude $h_t$. The output from each of the calls is a computed position of the fixed transponder. Step 268 shows that if neither of the computed positions matches the actual (stored) position of the fixed transponder, or if both computed positions match the actual position of the fixed transponder, then some sort of error has occurred; in which case the routine branches to its "error return" at step 242. If exactly one of the computed positions of the fixed transponder matches its actual position, then computer 46 continues with step 270. In step 270, the computer discards whichever hypothetical position of its own aircraft yielded the incorrect position of the fixed transponder; and the computer retains as valid, the hypothetical position that yielded the correct position of the fixed transponder.

In step 272, the computer stores the valid position as $(x_0, y_0, z_0)$, the actual position of aircraft 54 at time $t_1$. That position is then used to initiate or update a track of aircraft 54. If locator 40 has recently determined its aircraft's position, the last few (time, position, velocity) triples are used to compute (as an appropriately weighted average) the current velocity of the locator's aircraft. (Tracking routines are well-known; the invention does not depend on the use of any particular one.) Computer 46 stores the newly calculated velocity, and passes the position $(x_0, y_0, z_0)$ to the pilot's display device. (The display of the current position of aircraft 54 may also utilize the results of the tracking routine; however the particular display technique used by the locator is not relevant to the present invention.) After completing these actions, computer 46 exits the routine at step 274.

FIG. 19 shows the routine by which computer 46 determines the position of an aircraft other than its own. Because there could be many aircraft in the vicinity of locator 40, this routine would normally need to be executed at a fairly high frequency. For example, the execution frequency might be programmed to depend on the average rate at which the locator is receiving aircraft transponder replies.

As can be seen from steps 300, 302, 304, and 306, the routine operates as a loop. In each pass through the loop, computer 46 attempts to determine the position of another aircraft, basing its determination partly on the transponder replies it has received, emanating from that aircraft. If in step 302 the computer is unable to find a suitable sequence of replies for processing, then, as is shown in steps 304 and 306, the routine's current execution is terminated.

Step 308 serves as a general "return" for each pass through the loop. Whether the processing yielded an aircraft position, or was for some reason unsuccessful, the program in step 308 labels each of the transponder replies previously selected (in step 302) as being no longer usable. Computer 46 then proceeds to step 302, where it again attempts to find a sequence of transponder replies from which it will calculate another aircraft's position.

In order to find, in step 302, a sequence of transponder replies on which to base its calculations of another aircraft's position, computer 46 searches the table of aircraft transponder replies, loaded in step 168. In searching the table, the computer ignores replies labeled as being no longer usable. A sequence of replies is suitable for processing if and only if it satisfies the following criteria:

1. The replies were all received by the locator within a beam dwell (time tolerance) of each other.
2. The arrival times of the replies fit some radar's known stagger pattern, including possibly the "trivial" pattern of equal spacing—i.e. no staggering.
3. The replies have at most two different codes; and if there are two codes, the changing of codes from reply to reply fits the mode interlace pattern of the radar whose stagger pattern matched the reply arrival times. That radar is then presumed to be the one which elicited the transponder replies.
4. The last stored reply that could be part of the sequence was received some parameter time tolerance ago. This tolerance, on the order of a beam dwell, guarantees that the locator has received all replies from the radar beam's passage over the transponder.
5. The radar whose stagger pattern matched the reply times has a known scan rate; the locator recently received replies from at least one of that radar's associated fixed transponders; and computer 46 has already processed those replies to determine (at step 182) when the radar beam's center passed over the fixed transponder.

Upon finding a suitable sequence of aircraft transponder replies, computer 46 proceeds to step 310, where it searches the table of (reports of) transmissions received from the radar whose interrogations elicited the selected transponder replies. In its search through the table of radar transmissions, the computer attempts to find a sequence of ISLS broadcasts that matches the selected sequence of transponder replies. That is, the computer searches for a sequence that:

1. has the same stagger pattern, if any, as the selected aircraft transponder reply sequence.
2. is the most recent such ISLS sequence for which each broadcast arrived at the locator prior to the arrival of the corresponding aircraft transponder reply.
3. has the arrival times of its ISLS broadcasts no more than some parameter time tolerance ahead of the arrival times of the corresponding aircraft transponder replies. (This criterion, a "reasonableness" check, might initially use a tolerance based on the maximum distances expected in the computation. If the locator has recently determined the position of the other aircraft, the tolerance might be based on recent values of the time difference $t_2' - t_1'$.)

If the computer is unable to find such a sequence of ISLS broadcasts, then as shown in step 312, it returns to step 308. Otherwise, it proceeds to step 314, in which it begins to calculate the position of the aircraft which emitted the selected transponder replies.

In step 314, the computer determines the aircraft's bearing with respect to the radar that elicited the selected replies. To do so, it first determines the time $t_a$ at which the beam center passed over the aircraft transponder, by averaging the reply arrival times. This processing is analogous to that performed in steps 182 and 210. The computer next retrieves from storage the scan rate of the radar, $\omega_r$. The computer also retrieves the bearing, $\theta_f$, and a recent center-azimuth time, $t_f$, of a fixed transponder associated with the radar. The computer multiplies the time difference $t_a - t_f$ by the radar's scan rate $\omega_r$, and stores the product as $\eta$, the difference between the bearings of the aircraft and the fixed transponder at time $t_a$. The computer also calculates and stores the quantity $\tan\eta$, and the sum $\eta + \theta_f$, which sum is the bearing of the aircraft with respect to the radar at time $t_a$. (All of the computations involving angles are done modulo 360°.)

In step 316, computer 46 decodes the replies which, according to the radar's mode interlace pattern, are responses to mode C interrogations. The aircraft's reported altitude, or as appropriately weighted average of all the altitudes reported in the mode C replies, is then stored as the aircraft's altitude, $z_1$, at time $t_a$. If the locator did not receive any replies to mode C interrogations, as could happen, for example, if the aircraft's transponder does not have mode C capability, then computer 46 takes the other aircraft's altitude $z_1$ to be the same as its own altitude, $z_0$—which is the most cautious approach for collision avoidance purposes.

As shown in step 318, the computer next calculates the time difference $t_2' - t_1'$, the time by which each ISLS broadcast preceded its corresponding aircraft transponder reply in arriving at the locator. As in step 244, only one transponder reply and matching ISLS broadcast are needed to establish $t_2' - t_1'$; but the typical presence of several replies, all resulting from a single beam passage, and of the replies' corresponding ISLS broadcasts, enables the computer to more accurately estimate $t_2' - t_1'$ by averaging the corresponding arrival time differences.

In step 320, the computer retrieves from storage a recent determination of its own aircraft's position, preferably the (time, position, velocity) triple, stored at step 272, having time closest to $t_a$. It then extrapolates therefrom, to determine its aircraft's position at time $t_a$. If the derivation of its own aircraft's position was based on a (radar, fixed transponder) pair different from that currently being used to determine the other aircraft's position, the locator then converts the extrapolated position to its value $(x_0, y_0, z_0)$ in the coordinate system based on the radar and fixed transponder currently being used.

In step 322, the computer retrieves from storage the altitudes of the radar and fixed transponder, $h_r$ and $h_t$ respectively. It also retrieves the prestored or precomputed distance d between the radar and the fixed transponder. Using these constants, computer 46 then calculates, at step 324, trigonometric functions of three significant angles, $\alpha$, $\beta$, and $\gamma$.

The definition of $\alpha$, and the formulas for computing trigonometric functions thereof, are those given in the description of step 246; however the computation is redone in the present routine, since the values of $h_r$, $h_t$, and d may be different for the possibly different radar and fixed transponder being used to determine the other aircraft's position.

$\beta$ is the angle between two vertical planes: the vertical plane containing the fixed transponder and the radar, and the vertical plane containing the locator-equipped aircraft and the radar. Viewing the earth's surface from above, $\beta$ is measured counterclockwise, from the plane containing the fixed transponder to the plane containing the locator-equipped aircraft i.e., $\beta$ is measured by the usual mathematical convention.

When $z_0$, the altitude of the locator-equipped aircraft, is greater than $h_r$, the altitude of the radar, $\gamma$ is the acute angle at which the line through the aircraft and the radar intersects the plane of the earth's surface. In the rare cases in which $h_r$ is greater than $z_0$, $\gamma$ is the negative of that angle; and in the rare case in which $h_r = z_0$, $\gamma$ is 0.

Before calculating trigonometric functions of $\beta$ and $\gamma$, computer 46 calculates the length e of the line segment extending from the radar to the locator-equipped aircraft; and also computes length $e_h$ of that line segment's projection onto the plane of the earth's surface. The formulas for these computations are:

$$e = \sqrt{(x_0 + (d/2)\cos\alpha)^2 + y_0^2 + (z_0 - h_r)^2} \text{ and}$$

$$e_h = \sqrt{(x_0 + (d/2)\cos\alpha)^2 + y_0^2}.$$

The trigonometric functions of $\beta$ and $\gamma$ are then easily computed:

$$\sin\beta = \frac{y_0}{e_h},$$

$$\cos\beta = \frac{x_0 + (d/2)\cos\alpha}{e_h},$$

$$\tan\beta = \frac{\sin\beta}{\cos\beta},$$

$$\sin\gamma = \frac{z_0 - h_r}{e},$$

$$\cos\gamma = \frac{e_h}{d}, \text{ and}$$

$$\tan\gamma = \frac{\sin\gamma}{\cos\gamma}.$$

Having computed trigonometric functions of $\alpha$, $\beta$, and $\gamma$, the computer then calculates intermediate quantities G, H, I, and J, according to the formulas $G = \cos\gamma\sin\beta + \cos\gamma\cos\beta\tan\eta$, $H = \cos\beta - \sin\beta\tan\eta$, $I = -(\sin\gamma\sin\beta + \sin\gamma\cos\beta\tan\eta)$, and $J = \frac{1}{2}(((d/2)\cos\alpha - x_0)\tan\eta - d\cos\alpha\tan\eta - y_0)$.

The computer next calculates intermediate quantities K, L, and M, according to the formulas $$K = \frac{2z_1 - h_r - z_0}{2\cos\gamma},$$

$$L = \frac{J - IK}{H}, \text{ and}$$

$$M = \frac{G - I\tan\gamma}{H}.$$

Computer 46 follows its calculation of constants in step 324 by determining, in step 326, the ellipsoid on which the other aircraft is located. The computer first calculates $t_2' - t_0'$, the total elapsed time from the issuance of the radar's interrogation until the locator's receipt of the other aircraft's reply thereto. The elapsed time is calculated by the formula $t_2' - t_0' = (t_2' - t_1') + e/c$. The computer subtracts the turnaround time, $t_t$, from the total elapsed time $t_2' - t_0'$; and it multiplies the difference thereby obtained by c, the speed of electromagnetic propagation, to obtain the sum $X + Y = c(t_2' - t_0' - t_t)$.

As a safety check, computer 46 then verifies that $X + Y$ is greater than e. If that is not the case, then there is some problem with the data, or with a previous computation; further computations will not be successful; and so the computer proceeds directly to step 308.

On the other hand, if $X + Y$ is greater than e, computer 46 continues at step 328 its derivation of the other aircraft's position, first calculating $g = (X+Y)/2$, and then calculating $h^2 = g^2 - (e/2)^2$. The computer next calculates intermediate quantities P, Q, and R, according to the formulas $P = h^2 + g^2(M^2 + \tan^2\gamma)$, $Q = -2g^2(LM + K\tan\gamma)$, $R = g^2(L^2 + K^2 - h^2)$;

and then calculates the quantity $Q^2 - 4PR$. If $Q^2 - 4PR$ is negative, an error has occurred in data acquisition or computation, and further computations will not yield real solutions. In that case, the computer branches immediately to step 388.

If, however, $Q^2 - 4PR$ is nonnegative, computer 46 continues the derivation at step 328, where it calculates two possible solutions for the position of the other aircraft. The solutions, $(r_1(+), s_1(+), t_1(+))$ and $(r_1(-), s_1(-), t_1(-))$, are computed in an intermediate coordinate system based on the locations of the radar and the locator-equipped aircraft, according to the formulas:

$$r_1^{(+)} = \frac{-Q + \sqrt{Q^2 - 4PR}}{2P},$$

$$s_1^{(+)} = L - Mr_1^{(+)},$$

$$t_1^{(+)} = K - r_1^{(+)}\tan\gamma,$$

$$r_1^{(-)} = \frac{-Q - \sqrt{Q^2 - 4PR}}{2P},$$

$$s_1^{(-)} = L - Mr_1^{(-)},$$

-continued
$$t_1^{(-)} = K - r_1^{(-)} \tan\gamma.$$

The computer then converts the positions expressed in intermediate coordinates, $(r_1(+), s_1(+), t_1(+))$ and $(r_1(-), s_1(-), t_1(-))$, to their respective expressions, $(x_1(+), y_1(+), z_1)$ and $(x_1(-), y_1(-), z_1)$, as points in a "final" coordinate system based partially on the locations of the radar and fixed transponder, and having the plane of the earth's surface as its (x,y)-plane. The equations used by the computer to perform this conversion are:

$$x_1(+) = (r_1(+)\cos\gamma - t_1(+)\sin\gamma)\cos\beta - s_1(+)\sin\beta + \tfrac{1}{2}(x_0 - (d/2)\cos\alpha),$$

$$y_1(+) = (r_1(+)\cos\gamma - t_1(+)\sin\gamma)\sin\beta + s_1(+)\cos\beta + \tfrac{1}{2}y_0,$$

$$x_1(-) = (r_1(-)\cos\gamma - t_1(-)\sin\gamma)\cos\beta - s_1(-)\sin\beta + \tfrac{1}{2}(x_0 - (d/2)\cos\alpha), \text{ and}$$

$$y_1(-) = (r_1(-)\cos\gamma - t_1(-)\sin\gamma)\sin\beta + s_1(-)\cos\beta + \tfrac{1}{2}y_0.$$

The value of $z_1$ was input—or if not available from transponder reply data, was assumed to be the same as $z_0$—and it is therefore unnecessary to recompute $z_1$.

Of these two solutions, $(x_1(+), y_1(+), z_1)$ and $(x_1(-), y_1(-), z_1)$, one is correct and the other extraneous. The computer proceeds to step 330, in which it tests to determine which solution is correct. The first test performed at step 330 verifies that none of the following conditions exists:
(1) $y_1(+)$ and $y_1(-)$ have the same sign;
(2) one of $y_1(+)$ or $y_1(-)$ is 0, but not the other;
(3) $x_1(+) + (d/2)\cos\alpha$ and $x_1(-) + (d/2)\cos\alpha$ have the same sign.

If any of these three conditions is satisfied, an error has occurred, and the computer immediately branches to step 308. Otherwise the computer determines the correct solution by checking the value of $\eta$. In particular, if $\eta$ is strictly between 0° and 180°, the correct solution is the one whose second coordinate—i.e. $y_1(+)$ or $y_1(-)$—is negative. If $\eta$ is strictly between 180° and 360°, the correct solution is the one whose second coordinate, $y_1(+)$ or $y_1(-)$, is positive. If $\eta = 0°$, the correct solution is the one having its first coordinate, $x_1(+)$ or $x_1(-)$, greater than $-(d/2)\cos\alpha$. In the only case remaining, $\eta = 180°$, the correct solution is the one having its first coordinate, $x_1(+)$ or $x_1(-)$, less than $-(d/2)\cos\alpha$. In which ever case prevails, the computer retains the correct solution, storing it as $(x_1,y_1,z_1)$, the position of the other aircraft at time $t_a$; and the computer discards the extraneous solution.

In step 332, the computer passes the position of the other aircraft, $(x_1,y_1,z_1)$, to a threat assessment routine, which determines whether to display the position to the pilot. The threat assessment routine should utilize or incorporate a tracking routine to permit prediction of the course of any potentially threatening aircraft; however, the particular threat assessment routine used by the locator is not relevant to the present invention.

The computer finally returns to step 308, where its program causes it to label the selected transponder replies as having been already processed, and from which it proceeds to step 302, to attempt another pass through the loop.

I claim:

1. Apparatus in own aircraft for passively determining the position of said own aircraft by utilizing differences between times of arrival at said own aircraft of Improved Sidelobe Suppression (ISLS) pulse pairs transmitted from a Secondary Surveillance Radar (SSR) and trains of reply pulses (replies) transmitted by a fixed secondary-radar transponder on response to mode A and mode C interrogation pulse pairs (interrogation) transmitted by said SSR, and for passively determining the position of any proximate transponder-equipped other aircraft by utilizing said determined position of said own aircraft and differences between times of arrival at said own aircraft of said ISLS pulse pairs and replies transmitted by said other aircraft's airborne transponder in response to said interrogations, comprising:

means for prestoring location data for at least one ground-based SSR continually transmitting said mode A and mode C interrogations through an irradiating rotating beam, and omnidirectionally transmitting an ISLS pulse pair with each interrogation, the first pulse of each said ISLS pulse pair being transmitted together with a first pulse of an interrogation; for prestoring location data for at least one fixed transponder, said transponder being equipped to receive interrogations from only said SSR and to respond to each said mode A interrogation with a locally unique coded reply; for prestoring operational data describing said SSR's mode A–mode C interlace pattern, stagger pattern, pulse repetition frequency, and rotation rate; and for prestoring signal data identifying said fixed transponder's locally unique coded reply;

a first receiving means continually receiving said ISLS pulse pairs, for receiving said interrogation pulse pairs when said own aircraft is irradiated by said beam, for decoding said pulse pairs to distinguish said mode A interrogations, mode C interrogations, and ISLS pulse pairs respectively; and for recording times of arrival at said own aircraft of leading edges of said first pulses of said interrogation pulse pairs and ISLS pulse pairs;

a first determining means responsive to said first receiving means for initially determining said SSR's positions in said stagger pattern and said mode A–mode C interlace pattern; and for extrapolating said SSR's positions in said stagger pattern and said interlace pattern and comparing said times of arrival at said own aircraft with said extrapolated positions to determine whether said SSR transmitted said received interrogations and ISLS pulse pairs;

a second receiving means for receiving and decoding replies omnidirectionally transmitted by said fixed transponder and by said other-aircraft transponder in response to said interrogations when said transponders are respectively irradiated by said beam; and for recording times of arrival at said own aircraft of leading edges of first pulses of said fixed-transponder replies and said other-aircraft-transponder replies;

a third receiving means for receiving and recording said own aircraft's altitude;

a second determining means responsive to said second receiving means for identifying said fixed transponder and said SSR from said prestored signal data and said locally unique coded replies transmitted by said fixed transponder; and for determining said other aircraft's identity and altitude from said other aircraft transponder's decoded replies to said mode A and mode C interrogations respectively;

a first calculating means for updating said operational data by identifying each reply of decoded fixed-transponder replies to determine said mode A-mode C interlace pattern; by calculating differences between successive times of arrival of said leading edges of first pulses of fixed-transponder replies occurring within a single passage of said beam over said fixed transponder, to obtain a sequence of time intervals representing said SSR's stagger pattern; by calculating the reciprocal of an average of said intervals to determine said SSR's pulse repetition frequency; by averaging said arrival times of fixed transponder replies ocurring within each passage of said beam over said fixed transponder to determine times when a center of said beam irradiated said fixed transponder, and calculating a difference of said times to determine said SSR's rotation period; and by calculating a reciprocal of said rotation period to determine said SSR's rotation rate;

a second calculating means for repeatedly calculating said own aircraft's bearing with respect to said SSR by utilizing said prestored location data to calculate said fixed transponder's bearing with respect to said SSR; by averaging said interrogation arrival times at said own aircraft during a single passage of said beam over said own aircraft, to determine times when said beam cenber irradiated said own aircraft; by calculating a difference between a time when said beam center irradiated said own aircraft and a time when said beam center irradiated said fixed transponder; by multiplying said differrence by said SSR's rotation rate; and by adding the product of said multiplication to said fixed transponder's bearing with respect to said SSR;

a first matching means for matching a time of arrival $t_2$ at said own aircraft of a leading edge of a first pulse of a fixed transponder reply, with a time of arrival $t_1$ at said own aircraft of a leading edge of a first pulse of an ISLS pulse pair transmitted together with the interrogation whose elicited reply from said fixed transponder arrived at said own aircraft at said time $t_2$;

means for extrapolating said own aircraft calculated bearing with respect to said SSR to determine said own aircraft bearing with respect to said SSR at said time $t_1$;

a third, calculating means for repeatedly calculating said own aircraft's position by utilizing said prestored location data to calculate a distance d between said SSR and said fixed transponder; by calculating a difference of said arrival times $t_2-t_1$, subtracting therefrom a standardized transponder turnaround time $t_t$, multiplying the result thereof by a propagation speed of electromagnetic radiation c, subtracting from the resulting product said distance d and calculating the absolute value of the resulting difference to obtain $|V-U|$, the absolute value of the difference between the distances from said own aircraft to said SSR and from said own aircraft to said fixed transponder, according to the equation $|V-U|=|c(t_2-t_1-t_t)-d|$; solving linear and quadratic equations yielding not more than two points, of intersection of a horizontal plane representing said own aircraft's altitude, a vertical half-plane representing said own aircraft's bearing from said SSR, and a hyperboloid representing points whose distances from said SSR and from said fixed transponder differ by $|U-V|$; and by determining which of said points of intersection represents said own aircraft's position;

a fourth calculating means for repeatedly calculating said other aircraft's bearing with respect to said SSR by averaging said arrival times at said own aircraft of said other aircraft transponder's replies occurring during a single passage of said beam over said other aircraft to determine a time when said beam center irradiated said other aircraft; by calculating a difference between said time when said beam center irradiated said other aircraft and a time when said beam center irradiated said fixed transponder; by multiplying said difference by said rotation rate of said SSR, and adding the resulting product to the bearing of said fixed transponder with respect to said SSR;

a second extrapolating means for extrapolating from said own aircraft's calculated positions to determine said own aircraft's position at said time when said beam center irradiated said other aircraft;

a fifth calculating means for calculating a distance e between said own aircraft and said SSR utilizing said prestored location data for said SSR and said extrapolated position of said own aircraft;

a second matching means for matching a time of arrival $t_2'$ at said own aircraft of a leading edge of a first pulse of said other-aircraft-transponder reply with a time of arrival $t_1'$ at said own aircraft of a leading edge of a first pulse of an ISLS pulse pair transmitted together with the interrogation whose elicited reply from said other aircraft, transponder arrived at said own aircraft at said time $t_2'$;

a sixth calculating means for calculating said other aircraft position by dividing said distance e by said electromagnetic propagation speed c, and subtracting the resulting quotient from said time $t_1'$ to obtain a time $t_0'=t_1'-e/c$ at which said SSR transmitted the leading edge of the first pulse of said ISLS pulse pair which arrived at said own aircraft at said time $t_1'$; by calculating the difference $t_2'-t_0'$, subtracting therefrom said turnaround time $t_t$, and multiplying the result thereof by said propagation speed c to obtain $X+Y$, the sum of distances from said other aircraft to said SSR and from said other aircraft to said own aircraft, according to the equation $X+Y=c(t_2'-t_0'-t_t)$; and by solving linear and quadratic equations and linear inequalities to determine a point of intersection of a horizontal plane representing said other aircraft's altitude, a vertical half-plane representing said other aircraft's bearing with respect to said SSR, and an ellipsoid representing points, the sum of whose distances from said SSR and from said own aircraft equals $X+Y$, said intersection representing the position of said other aircraft; and display means for displaying said calculated position of said own aircraft for navigational purposes and for displaying said calculated positions of said own aircraft and said other aircraft for collision-avoidance purposes.

2. Apparatus in own aircraft for passively determining the position of said own aircraft by utilizing differences between times of arrival at said own aircraft of Improved Sidelobe Suppression (ISLS) pulse pairs transmitted from a Secondary Surveillance Radar (SSR) and trains of reply pulses (replies) transmitted by a fixed secondary-radar transponder in response to mode A and mode C interrogating pulse pairs (interrogations) transmitted by said SSR, and for passively determining the position of any proximate transponder-equipped other aircraft by utilizing said determined position of said own aircraft and differences between times of arrival at said own aircraft of said ISLS pulse pairs and replies transmitted by said other aircraft's airborne transponder in response to said interrogations, comprising;

means for prestoring location data for said SSR and for said fixed transponder, and for prestoring signal data identifying said fixed transponder's mode A reply code;

a first determining means for determining times of arrival at said own aircraft of leading edges of said ISLS and interrogation pulse pairs;

a second determining means for determining times of arrival at own aircraft of leading edges of said replies by said fixed transponder and by said other-aircraft transponder;

a third determining means for determining said own aircraft's altitude;

a fourth determining means for determining said other aircraft's altitude from said other-aircraft-transponder replies to said mode C interrogations;

a calculating means for calculating the position of said own aircraft utilizing said own aircraft's altitude, said times of arrival of said interrogation pulses, said times of arrival of said leading edges of said ISLS pulses and said replies from said fixed transponder, and said prestored location and signal data; and for calculating, the position of said other aircraft utilizing said other aircraft's altitude, said calculated position of said own aircraft, said times of arrival of said leading edges of said ISLS pulses and said replies by said other aircraft transponder, and said prestored location and signal data; and a display means for indicating said calculated position of said own aircraft for navigational purposes, and for indicating said calculated positions of said own aircraft and said other aircraft for collision-avoidance purposes.

3. A method of passively determining in own aircraft the position of said own aircraft by utilizing differences between times of arrival at said own aircraft of Improved Sidelobe Suppression (ISLS) pulse pairs transmitted from a Secondary Surveillance Radar (SSR) and trains of reply pulses (replies) transmitted by a fixed secondary-radar transponder in response to mode A and mode C interrogation pulse pairs (interrogations) transmitted by said SSR, and for passively determining the position of any proximate transponder-equipped other aircraft by utilizing said determined position of said own aircraft and differences between times of arrival at said own aircraft of said ISLS pulse pairs and replies transmitted by said other aircraft's airborne transponder in response to said interrogations, comprising the steps of:

prestoring location data for said SSR and for said fixed transponder, and prestoring signal data identifying said fixed transponder's mode A reply;

determining times of arrival at said own aircraft of leading edges of said ISLS and interrogation pulse pairs;

determining times of arrival at own aircraft of leading edges of said replies by said fixed transponder and by said other-aircraft transponder;

determining said own aircraft's altitude;

determining said other aircraft's altitude from said other-aircraft-transponder replies to said mode C interrogations;

calculating the position of said own aircraft utilizing said own aircraft's altitude, said times of arrival of said interrogation pulses, said times of arrival of said leading edges of said ISLS pulses and said replies from said fixed transponder, and said prestored location and signal data; and calculating the position of said other aircraft utilizing said other aircraft's altitude, said calculated position of said own aircraft, said times of arrival of said leading edges of said ISLS pulses and said replies by said other aircraft transponder, and said prestored location and signal data; and indicating said calculated position of said own aircraft for navigational purposes, and indicating said calculated positions of said own aircraft and said other aircraft for collision-avoidance purposes.

4. Apparatus in own aircraft for passively determining the position of said own aircraft by utiliing differences between times of arrival at said own aircraft of Improved Sidelobe Suppression (ISLS) pulse pairs transmitted from a Secondary Surveillance Radar (SSR) and trains of reply pulses (replies) transmitted by a fixed secondary-radar transponder in response to mode A and mode C interrogation pulse pairs (interrogations) transmitted by said SSR, and for passively determining the position of any proximate transponder-equipped other aircraft by utilizing said determined position of said own aircraft and differences between times of arrival at said own aircraft of said ISLS pulse pairs and replies transmitted by said other aircraft's airborne transponder in response to said interrogations, comprising:

means for prestoring location data for at least one ground-based SSR continually transmitting said interrogations through an irradiating rotating beam, and omnidirectionally transmitting an ISLS pulse pair with each interrogation, the first pulse of each said ISLS pulse pair being transmitted together with a first pulse of an interrogation; for prestoring location data for at least one fixed transponder, said transponder being equipped to receive interrogations from only said SSR and to respond to each said mode A interrogation with a locally unique coded reply; and for prestoring signal data identifying said fixed transponder's locally unique coded reply;

a first receiving means for recording times of arrival at own aircraft of leading edges of said ISLS and interrogation first pulses;

a second receiving means for decoding replies omnidirectionally transmitted by said fixed transponder and by said airborne transponder in response to said interrogations when said transponders are respectively irradiated by said beam; and for recording times of arrival at said own aircraft or leading edges of first pulses of said fixed transponder replies and said other-aircraft-transponder replies;

a third receiving means for receiving and recording said own aircraft's altitude;

means for identifying said fixed transponder and said SSR from said prestored signal data and said locally unique coded replies transmitted by said fixed transponder; and for determining said other aircraft's identity and altitude from said other aircraft transponder's decoded replies to said mode A and mode C interrogations respectively;

a first calculating means for determining times when a center of said beam irradiated said fixed transponder, by averaging arrival times of said fixed-transponder replies at said own aircraft occurring during a single passage of said beam over said fixed transponder; for calculating a difference between successive times when said beam center irradiated said fixed transponder to determine said SSR's rotation period; and for calculating the reciprocal of said rotation period to determine said SSR's rotation rate;

a second, calculating means for repeatedly calculating said own aircraft's bearing with respect to said SSR by utilizing said prestored location data to calculate said fixed transponder's bearing with respect to said SSR, by averaging interrogation arrival times at said own aircraft during a single passage of said beam center irradiated said own aircraft; by calculating a difference between a time when said beam center irradiated said own aircraft and a time when said beam center irradiated said fixed transponder; by multiplying said difference by said SSR rotation rate, and by adding the product of said multiplication to said fixed transponder's bearing with respect to said SSR;

a first matching means for matching a time of arrival $t_2$ at said own aircraft of a leading edge of a first pulse of a fixed transponder reply, with a time of arrival $t_1$ at said own aircraft of a leading edge of a first pulse of an ISLS pulse pair transmitted together with the interrogation whose elicited reply from said fixed transponder arrived at said own aircraft at said time $t_2$;

means for extrapolating said own aircraft calculated bearing with respect to said SSR to determine said own aircraft bearing with repect to said SSR at said time $t_1$;

a third calculating means for calculating said own aircraft's position by utilizing said prestored location data to calculate a distance d between said SSR and said fixed transponder; by calculating a difference of said arrival times $t_2 - t_1$, subtracting therefrom a standardized transponder turnaround time $t_t$, multiplying the result thereof by a propagation speed of electromagnetic radiation c, subtracting from the resulting product said distance d, and calculating the absolute value of the resulting difference to obtain $|V-U|$, the absolute value of the difference between the distances from said own aircraft to said SSR and from said own aircraft to said fixed transponder, according to the equation $|V-U| = |c(t_2-t_1-t_t)-d|$; by solving linear and quadratic equations yielding not more than two points, of intersection of a horizontal plane representing said own aircraft's altitude, a vertical half-plane representing said own aircraft's bearing from said SSR, and a hyperboloid representing points whose distances from said SSR and from said fixed transponder differ by $|V-U|$; and by determining which of said points of intersection represents said own aircraft's position;

a fourth calculating means for repeatedly calculating said other aircraft's bearing with respect to said SSR by averaging said arrival times at said own aircraft of said other-aircraft transponder's replies occurring during a single passage of said beam over said other aircraft to determine a time when said beam center irradiated said other aircraft; by calculating a difference between said time when said beam center irradiated said other aircraft and a time when said beam center irradiated said fixed transponder; by multiplying said difference by said rotation rate of said SSR, and adding the resulting product to the bearing of said fixed transponder with respect to said SSR;

means for extrapolating from said own, aircraft's calculated positions to determine said own aircraft's position at said time when said beam center irradiated said other aircraft;

a fifth calculating means for calculating a distance e between said own aircraft and said SSR utilizing said prestored location data for said SSR and said extrapolated position of said own aircraft;

a second matching means for matching a time of arrival $t_2'$ at said own aircraft of a leading edge of a first pulse of said other-aircraft transponder reply with a time of arrival $t_1'$ at said own aircraft of a leading edge of a first pulse of an ISLS pulse pair transmitted together with the interrogation whose elicited reply from said other-aircraft transponder arrived at said own aircraft at said time $t_2'$;

a sixth calculating means for calculating said other aircraft's position by dividing said distance e by said electromagnetic propagation speed c, and subtracting the resulting quotient from said time $t_1'$ to obtain a time $t_o' = t_1' - e/c$ at which said SSR transmitted the leading edge of the first pulse of said ISLS pulse pair which arrived at said own aircraft at said time $t_1'$; by calculating the difference $t_2' - t_o'$, subtracting therefrom said turnaround time $t_t$, and multiplying the result thereof by said propagation speed c to obtain $X+Y$, the sum of the distances from said other aircraft to said SSR and from said other aircraft to said own aircraft, according to the equation $X+Y = c(t_2' - t_o' - t_t)$; and by solving linear and quadratic equations and linear inequalities to determine a point of intersection of a horizontal plane representing said other aircraft's altitude, a vetical half-plane representing said other aircraft's bearing with respect to said SSR, and an ellipsoid representing points, the sum of whose distances from said SSR and from said own aircraft equals $X + Y$, said intersection representing the position of said other aircraft; and means for displaying said calculated position of said own aircraft for navitgational purposes and for displaying said calculated positions of said own aircraft and said other aircraft for collision-avoidance purposes.

5. An apparatus as in claim 7 further comprising means for prestoring characteristic operational data for said SSR's mode A–mode C interlace pattern, stagger pattern, pulse repetition frequency, and said rotation rate.

6. An apparatus as in claim 5 further comprising means for determining said SSR's positions in said mode A–mode C interlace pattern and said stagger pattern, and for extrapolating said SSR's positions in said interlace and stagger patterns to determine whether said SSR transmitted said received interrogations and ISLS pulse pairs by comparing said times of arrival at said own aircraft of said received interrogations and ISLS pulse pairs with said extrapolated positions.

7. An apparatus as in claim 5 further comprising means for updating said characteristic operational data: by identifying each reply of said fixed transponder replies to determine said mode A–mode C interlace pattern; by calculating differences between successive times of arrival of said leading edges of said first pulses of said fixed transponder replies occurring within a single passage of said beam over said fixed transponder, to obtain a sequence of time intervals representing said SSR's stagger pattern; and by calculating a reciprocal of an average of said intervals to determine said SSR's pulse repetition frequency.

8. A method of passively determining in own aircraft the position of said own aircraft by utilizing differences between times of arrival at said own aircraft of Improved Sidelobe Suppression (ISLS) pulse pairs transmitted by a Secondary Surveillance Radar (SSR) and trains of reply pulses (replies) transmitted by a fixed secondary-radar transponder in response to mode A and mode C interrogation pulse pairs (interrogations) transmitted by said SSR, and of passively determining the position of any proximate transponder-equipped other aircraft by utilizing said determined position of said own aircraft and differences between times of arrival at said own aircraft of said ISLS pulse pairs and replies transmitted from said other aircraft's airborne transponder in response to said interrogations, comprising the steps of:

prestoring location data for at least one ground-based SSR continually transmitting said interrogations through an irradiating rotating beam, and omnidirectionally transmitting an ISLS pulse pair with each interrogation, a first pulse of each said ISLS pulse pair being transmitted together with a first pulse of an interrogation; prestoring location data for at least one fixed transponder, said transponder being equipped to receive interrogations from only said SSR and to respond to each said mode A interrogation with a locally unique coded reply; and prestoring signal data identifying said fixed transponder's locally unique coded reply;

recording times of arrival at said own aircraft of leading edges of said ISLS and interrogtation first pulses;

decoding replies omnidirectinally transmitted by said fixed transponder and by said airborne transponder in response to said interrogations when said transponders are respectively irradiated by said beam; and recording times of arrival at said own aircraft of leading edges of first pulses of said fixed-transponder replies and said other-aircraft-transponder replies;

recording own aircraft's altitude;

identifying said fixed transponder and said SSR from said prestored signal data and said locally unique coded replies transmitted by said fixed transponder; and determining said other aircraft's identity and altitude from said airborne transponder's decoded replies to said mode A and mode C interrogations respectively;

determining times when a center of said beam irradiated said fixed transponder by averaging arrival times of said fixed transponder replies at said own aircraft occurring during a single passage of said beam over said fixed transponder; calculating a difference between successive times when said beam center irradiated said fixed transponder to determine said SSR's rotation period; and calculating the reciprocal of said rotation period to determine said SSR's rotation rate;

calculating repeadedly said own aircraft's bearing with respect to said SSR by utilizing said prestored location data to calculate said fixed transponder's bearing with respect to said SSR, by averaging interrogation arrival times at said own aircraft during a single passage of said beam over said own aircraft to determine times when said beam center irradiated said own aircraft; by calculating a difference between a time when said beam center irradiated said fixed transponder; by multiplying said difference by said SSR's rotation rate, and by adding the product of said multiplication to said fixed transponder's bearing with respect to said SSR;

matching a time of arrival $t_2$ at said own aircraft of a leading edge of a first pulse of a fixed transponder reply, with a time of arrival $t_1$ at said own aircraft of a leading edge of a first pulse of an ISLS pulse pair transmitted together with the interrogation whose elicited reply from said fixed transponder arrives at said own aircraft at said time $t_2$;

extrapolating said own aircraft calculated bearing with respect to said SSR to determine said own aircraft bearing with respect to said SSR at said time $t_1$;

calculating said own aircraft's position by utilizing said prestored location data to calculate a distance d between said SSR and said fixed transponder; by calculating a difference of said arrival times $t_2-t_1$, subtracting therefrom a standardized transponder turnaround time $t_t$, multiplying the result thereof by a propagation speed of electromagnetic radiation c, subtracting from the resulting product said distance d and calculating the absolute value of the resulting differnece to obtain $|V-U|$, the absolute value of the differnece between the distances from said own aircraft to said SSR and from said own aircraft to said fixed transponder according to the equation $|V-U|=|c(t_2-t_1-t_t)-d|$; by solving linear and quadratic equations yielding not more than two points of intersection of a horizontal plane representing said own aircraft's altitude, a vetical half-plane representing said own aircraft's bearing with respect to said SSR, and a hyperboloid representing points whose distances from said SSR and from said fixed transponder differ by $|V-U|$; and by determining the point of intersection representing said own aircraft's position;

calculating repeatedly said other aircraft's bearing with respect to said SSR by averaging said arrival times at said own aircraft of said other-aircraft transponder's replies occurring during a single assage of said beam over said other aircraft to determine a time when said beam center irradiated said other aircraft; by calculating a difference between said time when said beam center irradiated said other aircraft and a time when said beam center irradiated said fixed transponder; by multiplying said difference by said rotation rate of said SSR, and adding the resulting product to the bearing of said fixed transponder with respect to said SSR;

extrapolating from said calculated positions of said own aircraft to determine said own aircraft's position at said time when said beam center irradiated said other aircraft;

calculating a distance e between said own aircraft and said SSR utilizing said prestored location data for said SSR and said extrapolated position of said own aircraft;

matching a time of arrival $t_2'$ at said own aircraft of a leading edge of a first pulse of said other aircraft transponder reply with a time of arrival $t_1'$ at said own aircraft of a leading edge of a first pulse of an ISLS pulse pair transmitted together with the interrogation whose elicited reply from said other aircraft transponder arrived at said own aircraft at said time $t_2'$;

calculating said other aircraft's position by dividing said distance e by said electromagnetic propagation speed c, and subtracting the resulting quotient from said time $t_1'$ to obtain a time $t_o' = t_1' - e/c$ at which said SSR transmitted the leading edge of the first pulse of said ISLS pulse pair which arrived at said own aircraft at said time $t_1'$; by calculating the difference $t_2' - t_o'$, subtracting therefrom said turn-around time $t_t$, and multiplying the result thereof by said propagation speed c to obtain $X+Y$, the sum of the distances from said other aircraft to said SSR and from said other aircraft to said own aircraft, according to the equation $X+Y = c(t_2' - t_o' - t_t)$; and by solving linear and quadratic equations and linear inequalities to determine a point of intersection of a horizontal plane representing said other aircraft's bearing with respect to said SSR, and an ellipsoid representing points, the sum of whose distances from said SSR and from said own aircraft equals $X+Y$, said intersection representing the position of said other aircraft; and displaying said calculated position of said own aircraft for navigational purposes and displaying said calculated positions of said own aircraft and said other aircraft for collision-avoidance purposes.

9. A method as in claim 8 further comprising the steps of prestoring characteristic operational data for said SSR's mode A-mode C interlace pattern, stagger pattern, pulse repetition frequency, and said rotation rate.

10. A method as in claim 9 further comprising the steps of determining said SSR's positions in said mode A-mode C interlace pattern and said stagger pattern, and of extrapolating said SSR's positions in said interlace and stagger patterns to determine whether said SSR transmitted said received interrogations and ISLS pulse pairs by comparing said times of arrival at said own aircraft of said received interrogations and ISLS pulse pairs with said extrapolated positions.

11. A method as in claim 9 further comprising the steps of updating said characteristic operational data: by identifying each reply of said fixed transponder replies to determine said mode A-mode C interlace pattern; by calculating differences between successive times of arrival of said leading edges of said first pulses of said fixed transponder replies occurring within a single passage of said beam over said fixed transponder, to obtain a sequence of time intervals representing said SSR's stagger pattern; and by calculating a reciprocal of an average of said intervals to determine said SSR's pulse repetition frequency.

* * * * *

UNITED STATES PATENT AND TRADEMARK OFFICE
CERTIFICATE OF CORRECTION

PATENT NO. : 4,782,450
DATED : November 1, 1988
INVENTOR(S) : Bennett Flax

It is certified that error appears in the above-identified patent and that said Letters Patent is hereby corrected as shown below:

```
Column 3, line 28, replace "position" with -- positions --.
Column 3, line 65, replace "e.threr" with --either--.
Column 4, line 1, replace "loc" with --lock--.
Column 4, lines 12 and 13. Only one space is required between
"found" and "P1". Therefore, on line 12, delete spaces  after
"found" and on line 13, delete spaces before "P1".
Column 7, line 64, delete "." after "tions" and add a space in
place of the period.
Column 9, line 43, after "1090", insert --MHz receiver 44--
Column 9, line 54, replace "examples" with --example--.
Column 10, line 14, replace "locator" with --locator's 1090 MHz--.
Column 10, line 39, replace U =V" with --U = V--.
Column 11, line 2, replace "In.par-" with --In par--.
Column 13, line 42, replace "-" with --s--.
Column 13, line 43, delete "s".
Column 14, line 24, replace "interrogation' s" with
--interrogation's--.
Column 20, line 1, delete "." and insert a space in lieu thereof.
Column 20, line 50, replace "shoud" with --should--.
Column 21, line 22, replace "-" at the end of the line with --s--.
Column 21, line 23, delete "s".
```

UNITED STATES PATENT AND TRADEMARK OFFICE
CERTIFICATE OF CORRECTION

PATENT NO. : 4,782,450

DATED : November 1, 1988

INVENTOR(S) :

It is certified that error appears in the above-identified patent and that said Letters Patent is hereby corrected as shown below:

Column 21, line 45, replace "tire" with --time--.

Column 22, line 9, replace "a" with --$\alpha$--.

Column 22 line 39, replace "$t, \theta$" with --$\hat{t}, \hat{\theta}$--.

Column 22, line 39, replace "$\omega$" with --$\hat{\omega}$--.

Column 22, line 41, replace "$\theta + \omega(t_1 - t)$" with --$\hat{\theta} + \hat{\omega}(t_1 - \hat{t})$--.

Column 25, line 61, replace "sequenoe" with --sequence--.

Column 26, line 36, replace "as" with --an--.

Column 27, line 55, replace "$\frac{eh}{d}$" with --$\frac{eh}{e}$--.

Column 29, line 5, insert a space between "$S_i^{(+)},$" and "$t_i^{(+)}$".

Column 29, line 6, after "$t_i^{(-)}$", insert a right parenthesis --)--.

Column 29, lines 14, 16, 19, and 22: if these equations cannot fit on a single line for each equation, the second line of each equation should begin with a new term in the sum. Hyphens should not be used as they are easily confused with minus signs. The corrections are as follows for these equations:

Column 29, line 14, delete "$-S_i^{(+-}$".

Column 29, line 15, replace "$\sin\beta$" with --$-S_i^{(+)}\sin\beta$--.

Column 29, line 17, delete "$+S_i^{(+)}\cos\beta+-$".

Column 29, line 18, replace "$\frac{1}{2} y_0$" with --$+S_i^{(+)}\cos\beta + \frac{1}{2} y_0$--.

Column 29, line 20, delete "$-S_i^{(--)}$".

Column 29, line 21, replace "$\sin\beta$" with --$-S_i^{(-)}\sin\beta$--.

Column 29, line 22, delete "$+S_i^{(-)}\cos\beta+-$".

Column 29, line 23, replace "$\frac{1}{2} y_0$" with --$+S_i^{(-)}\cos\beta + \frac{1}{2} y_0$--.

UNITED STATES PATENT AND TRADEMARK OFFICE
CERTIFICATE OF CORRECTION

PATENT NO. : 4,782,450

DATED : November 1, 1988

INVENTOR(S) : Bennett Flax

It is certified that error appears in the above-identified patent and that said Letters Patent is hereby corrected as shown below:

Column 29, line 43, delete "$y^{(-}$".
Column 29, line 44, replace "$)$" with --$y^{(-)}$--.

In the Claims:
Column 30, line 7, replace "on" with --in--.
Column 30, line 9, replace "gation)" with --gations)--.
Column 31, line 51, delete ",".
Column 31, line 67, delete ",".
Column 32, line 35, delete ",".
Column 33, line 35, after "calculating" delete ",".
Column 34, line 25, replace "utiliing" with --utilizing--.
Column 34, line 63, replace "or" with --of--.
Column 35, line 19, delete ",".
Column 35, line 25, between "beam" and "center" insert --over said own aircraft to determine times when said beam--.
Column 35, line 61, delete ",".
Column 36, line 15, delete ",".
Column 36, line 48, replace "vetical" with --vertical--.
Column 36, line 52, delete space after "X".
Column 36, line 55, replace "navitgational" with --navigational--.
Column 36, line 59, replace "7" with --4--.

UNITED STATES PATENT AND TRADEMARK OFFICE
CERTIFICATE OF CORRECTION

PATENT NO. : 4,782,450
DATED : November 1, 1988
INVENTOR(S) : Bennett Flax

It is certified that error appears in the above-identified patent and that said Letters Patent is hereby corrected as shown below:

Column 37, line 47, replace "interrogtation" with --interrogation--.

Column 37, line 49, replace "omnidirectinally" with --omnidirectionally--.

Column 38, line 7, replace "repeadedly" with --repeatedly--.

Column 38, line 16, between adjacent words "said" and "fixed" insert --own aircraft and a time when said beam center irradiated said--.

Column 38, line 26, replace "arrives" with --arrived--.

Column 38, line 40, replace "differnece" with --difference--.

Column 38, line 41, replace "differnece" with --difference--.

Column 38, line 48, replace "vetical" with --vertical--.

Column 38, line 58, replace "assage" with --passage--.

Column 39, line 31, after "aircraft's" insert --altitude, a vertical half-plane representing said other aircraft's--.

Signed and Sealed this

Ninth Day of April, 1991

Attest:

HARRY F. MANBECK, JR.

Attesting Officer    Commissioner of Patents and Trademarks